US006002127A

United States Patent [19]

Vestal et al.

[11] Patent Number: 6,002,127

[45] Date of Patent: *Dec. 14, 1999

[54] TIME-OF-FLIGHT MASS SPECTROMETRY ANALYSIS OF BIOMOLECULES

[75] Inventors: Marvin L. Vestal, Houston, Tex.; Peter Juhasz, Watertown, Mass.

[73] Assignee: PerSeptive Biosystems, Inc., Framingham, Mass.

[ * ] Notice: This patent is subject to a terminal disclaimer.

[21] Appl. No.: 09/058,605

[22] Filed: Apr. 10, 1998

Related U.S. Application Data

[60] Continuation of application No. 08/730,822, Oct. 17, 1996, Pat. No. 5,760,393, which is a division of application No. 08/488,127, Jun. 7, 1995, Pat. No. 5,627,369, and a continuation of application No. 08/446,544, May 19, 1995, Pat. No. 5,625,184.

[51] Int. Cl.[6] .............................. B01D 59/44; H01J 49/00

[52] U.S. Cl. .............................................. 250/282; 250/287

[58] Field of Search ................................ 250/282, 423 P, 250/281, 287, 286

[56] References Cited

U.S. PATENT DOCUMENTS

| | | | |
|---|---|---|---|
| 4,730,111 | 3/1988 | Vestal et al. | 250/288 |
| 4,731,532 | 3/1988 | Frey et al. | 250/287 |
| 4,731,533 | 3/1988 | Vestal | 250/292 |
| 4,766,312 | 8/1988 | Fergusson et al. | 250/281 |
| 4,814,612 | 3/1989 | Vestal et al. | 250/288 |
| 4,861,989 | 8/1989 | Vestal et al. | 250/288 |
| 4,883,958 | 11/1989 | Vestal | 250/288 |
| 4,902,891 | 2/1990 | Vestal | 250/281 |
| 4,958,529 | 9/1990 | Vestal | 73/864.81 |
| 4,960,992 | 10/1990 | Vestal et al. | 250/288 |
| 4,999,493 | 3/1991 | Allen et al. | 250/288 |
| 5,015,845 | 5/1991 | Allen et al. | 250/288 |
| 5,045,694 | 9/1991 | Beavis et al. | 250/287 |
| 5,160,840 | 11/1992 | Vestal | 250/287 |
| 5,288,644 | 2/1994 | Beavis et al. | 436/94 |

FOREIGN PATENT DOCUMENTS

| | | | |
|---|---|---|---|
| WO 92/13629 | 8/1992 | WIPO | B01D 59/44 |

OTHER PUBLICATIONS

Wiley et al., "Time–of–Flight Mass Spectrometer with Improved Resolution," *The Review of Scientific Instruments,* vol. 26, No. 12, 1150–1157 (1955).

Van Breemen et al., "Time–Resolved Laser Desorption Mass Spectrometry," *Int'l. J. of Mass Spec. and Ion Physics,* 49 (1983) 35–50.

Tabet et al., "Laser Desorption Time–of–Flight Mass Spectrometry of High Mass Molecules," *Anal. Chem.,* 1984, 56, 1662.

Cotter et al., "Structural Determination of Lipid A from Gram Negative Bacteria Using Laser Desorption Mass Spectrometry," *Biomedical and Environmental Mass Spec.,* vol. 14, 591–598 (1987).

Heller et al., "Mass Spectral Analysis of Complex Lipids Desorbed Directly from Lyophilized Membranes and Cells," *Biochmical and Biophysical Research Communications,* vol. 142, No. 1, 1987, 194–199.

Cotter, "Time–of–Flight Mass Spectrometry: An Increasing Role in the Life Sciences," *Biomed, Environ. Mass Spectrom.* 18 (1989) 513.

(List continued on next page.)

*Primary Examiner*—Bruce C. Anderson
*Attorney, Agent, or Firm*—Testa, Hurwitz & Thibeault, LLP

[57] ABSTRACT

A time-of-flight mass spectrometer for measuring the mass-to-charge ratio of a sample molecule is described. The spectrometer provides independent control of the electric field experienced by the sample before and during ion extraction. Methods of mass spectrometry utilizing the principles of this invention reduce matrix background, induce fast fragmentation, and control the transfer of energy prior to ion extraction.

8 Claims, 17 Drawing Sheets

OTHER PUBLICATIONS

Spengler et al., "Ultraviolet Laser Desorption/Ionization Mass Spectrometry of Proteins above 100000 Daltons by Pulsed Ion Extraction Time–of–Flight Analysis," *Anal. Chem.*, vol. 62, No. 8, Apr. 15, 1990, 793–796.

Spengler et al., "Infrared Laser Desorption Mass Spectrometry of Oligosaccharides: Fragmentation Mechanisms and Isomer Analysis," *Anal. Chem.*, 1990, vol. 62, No. 17, 1731–1737.

Spengler et al., "Molecular Weight Determination of Underivatized Oligodeoxyribonucleotides by Positive–Ion Matrix–Assisted Ultraviolet Laser–Desorption Mass Spectrometry," *Rapid Comm. in Mass Spec.*, vol. 4, No. 4, 1990, 99–102.

Jacobson et al., "Applications of Mass Spectrometry to DNA Sequencing," *GATA* 8(8):223–229, 1991.

Jacobson et al., "An Approach to the Use of Stable Isotopes for DNA Sequencing," *Gneomics* 9, 51–59 (1991).

Cotter, "Time–of–Flight Mass Spectrometry for the Structural Analysis of Biological Molecules," *Anal. Chem.*, 1992, vol. 64, No. 21, 1027–1039.

Huth–Fehre et al., "Matrix–Assisted Laser Desorption Mass Spectrometry of Oligodeoxythymidylic Acids," *Rapid Comm. in Mass Spec.*, vol. 6, 209–213 (1992).

McLuckey et al., "Tandem Mass Spectrometry of Small Multiply Charged Oligonucleotides," *J. Am. Soc. Mass Spectrom.*, 1922, 3, 60–70.

Pan et al., "Measurement of Initial Translational Energies of Peptide Ions in Laser Desorption/Ionization Mass Spectrometry," *Org. Mass Sepctrom.*, 27 (1992) 3.

Currie et al., "Analysis of Oligodeoxynucleotides by Negative–Ion Matrix–Assisted Laser Desorption Mass Spectrometry," *J. Am. Soc. Mass Spectrom.*, 1993, 4, 955–963.

Fitzgerald et al., "Basic Matrices for the Matrix–Assisted Laser Desorption/Ionization Mass Spectrometry of Proteins and Oligonucleotides," *Anal. Chem.*, 1993, 65, 3204–3211.

Fitzgerald et al., "The Analysis of Mock DNA Sequencing Reactions Using Matrix–Assisted Laser Desorption/Ionization Mass Spectrometry," *Rapid Comm. in Mass Spec.*, vol. 7, 895–897 (1993).

Keough et al., "Antisense DNA Oligonucleotides II: The Use of Matrix–Assisted Laser Deosorption/Ionization Mass Spectrometry for the Sequence Verification of Methylphosphonate Oligodeoxyribonucleotides," *Rapid Comm. in Mass Spec.*, vol. 7, 195–200 (1993)

Pieles et al., "Matrix–Assisted Laser Desorption Ionization Time–of–Flight Mass Spectrometry: A Powerful Tool for the Mass and Sequence Analysis of Natural and Modified Oligonucleotides," *Nucleic Acid Research,* 1993, vol. 21, No. 14, 3191–3196.

Schneider et al., "Matrix–Assisted Laser Desorption Mass Spectrometry of Homopolymer Oligodeoxyribonculeotides. Influence of Base Composition on the Mass Spectrometric Response," *Organic Mass. Spec.*, vol. 28, 1353–1361 (1993).

Wang et al., "Gas–Phase Cationization and Protonation of Neutrals Generated by Matrix–Assisted Laser Desorption," *J. Am. Soc. Mass Spectrom.*, 1993, 4, 393–398.

Wu et al., "Matrix–Assisted Laser Desorption Time–of––Flight Mass Spectrometry of Oligonucleotides Using 3–Hydroxypicolinic Acid as an Ultraviolet–Sensitive Matrix," *Rapid Comm. in Mass Spec.*, vol. 7, 142–146 (1993).

Chen et al., "Laser Desorption Mass Spectrometry for Fast DNA Sequencing," *Conractor–Grantee Workshop IV,* Nov. 13–17, 1994, Santa Fe, NM.

Colby et al., "Improving the Resolution of Matrix–Assisted Laser Desorption/Ionization Time–of–Flight Mass Spectrometry by Exploiting the Correlation between Ion Position and Velocity," *Rapid Comm. in Mass Spec.*, vol. 8, 865–868 (1994).

Fitzgerald, "The Development of Matrix–Assisted Laser Desorption/Ionization Mass Spectrometry for DNA Sequencing," 1994.

Lennon et al., "Pulsed Ion Extraction Combined with High Accelerating Potentials for Matrix–Assisted Laser Desorption Time–of–Flight Mass Spectrometry," 42nd ASMS Conf. on Mass Spectrometry, May 29–Jun. 4, 1994, 501.

Mirgorodskaya et al., "Electrospray Ionization Time–of––Flight Mass Spectrometry in Protein Chemistry," *Anal. Chem.* 1994, 66, 99–107.

Pogue et al., "Applications of X–Rays for Ionization and Fragmentation in Time–of–Flight Mass Spectrometry," *42nd ASMS Conf. on Mass Spectrometry,* May 29–Jun. 3, 1994, 748.

Strupat et al., "Matrix–Assisted Laser Desorption Ionization Mass Spectrometry of Proteins Electroblotted after Polyacrylamide Gel Electrophoresis," *Anal. Chem.*, vol. 66, No. 4, Feb. 15, 1994, 464–470.

Tang et al., "Matrix–Assisted Laser Desorption/Ionization of Restriction Enzyme–Digested DNA," *Rapid Comm. in Mass Spec.*, vol. 8, 183–186 (1994).

Ens et al., "Delayed Extraction in Matrix–Assisted Laser Desorption," 43rd ASMS Conf. on Mass Spectrometry and Allied Topics, 1995, 684.

Juhasz et al., "Applications of High Resolution MALDI TOF to Oligonucleotide Problems," 43rd ASMS Conf. on Mass Spectrometry and Allied Topics, 1995, 364.

Reiber et al., "Hydroxy Benzophenones: A New Class of MALDI Matrices for Proteins/Peptides," 43rd ASMS Conf. on Mass Spectrometry and Allied Topics, 1995, 1249.

Vestal, et al., "Probing the Outer Limits of Performance for MALDI–TOF MS and MS–MS," 43rd AMSM Conf. on Mass Spectrometry and Allied Topics, 1995, 1209.

Nordhoff, "Role of Sample Preparation and Purification for UV– and IR MALDI of Oligonucleotides," Institute for Medical Physics and Biophysics, Univ. of Munster, Germany.

Schuette et al., "Sequence Analysis of Phosphorothioate Oligonucleotides via Matrix–Assisted Laser Desorption Ionization Time–of–Flight Mass Spectrometry".

K. Breuker et al., "Pulsed Ion Extraction to Improve the Mass Resolution in a Low–Acceleratio–Energy Linear–TOF MALDI Instrument" Abstract from 13th Int'l Mass Spectrometry Conference, Aug 29–Sep 2, 1994, Budapest Hungary, Th B24.

R.S. Brown et al., "Pulsed Ion Extraction with High Source Accelerating Fields for MALD Time–of–Flight Mass Spectrometry" Desorption of Mass Spectrometry of Large Organic Ions by Particle and Photon Induced Desorption Sunriver Lodge and Resort, OR (Mar. 27–31, 1994).

R.J. Cotter, Third Int'l Symposium on Mass Spectrometry in the Life Sciences, San Francisco, CA, Sep. 1994.

R.J. Cotter, Letter to Noubar B. Afeyan, Ph.D. of PerSeptive Biosystems, Inc., dated May 31, 1995.

G.R. Kinsel et al., "Resolution Enhancement in Linear Time–of–Flight Mass Spectrometry by Post–Source Pulse Focusing" *Intl. J. of Mass Spectrom. and Ion Processes* 104:35–44 (1991).

P.T.A. Reilly et al., Laser Desorption/Gas–Phase Ionization of the Amino Acid Tryptophan *Rapid Comm. in Mass Spectrom.* 8:731–734 (1994).

K.G. Standing et al., "Some Problems in Time–of–Flight Measurements" Proceedings of the Intl Conference on Instrumentation for Time–of–Flight Mass Spectrometry, Nov. 11–12, 1992, Chestnut Ridge, NY, pp. 9–21.

R.J. Cotter, "Progress and Prospects for TOF Mass Spectrometry" A Workshop Sponsored by the Time–of–Flight Interest Group, May 22, 1995, Proceedings The 43rd ASMS Conference on Mass Spectrometry and Allied Topics, May 21–26, 1995, Atlanta, Georgia, p. 1364 (Abstract).

R.C. Beavis et al., "Velocity Distributions of Intact High Mass Polypeptide Molecule Ions Produced by Matrix Assisted Laser Desorption", *Chem. Phys. Lett.* 181(5):479–484 (1991).

E.W. Blauth "Dynamic Mass Spectrometers" Elsevier Publishing Co., Amsterdam pp. 76–77 (1966).

J. Zhou et al., "Kinetic Energy Measurements of Molecular Ions Ejected into an Electric Field by Matrix–Assisted Laser Desorption" *Rapid Comm. in Mass Spect.* 6:671–678 (1992).

International Search Report in corresponding PCT Application No. PCT/US96/07133 dated Sep. 6, 1996.

TIME-OF-FLIGHT MASS SPECTROMETRY ANALYSIS OF BIOMOLECULES

RELATED APPLICATIONS

This is a continuation of application Ser. No. 08/730,822, filed Oct. 17, 1996, U.S. Pat. No. 5,760,393 which is a divisional of Ser. No. 08/488,127, filed Jun. 7, 1995, now U.S. Pat. No. 5,627,369, which is a continuation of Ser. No. 08/446,544, filed May 19, 1995, now U.S. Pat. No. 5,625, 184.

FIELD OF THE INVENTION

The invention relates generally to the field of mass spectrometry. In particular, the invention relates to a pulsed ion source for time-of-flight mass spectrometry and to methods of operating a mass spectrometer.

BACKGROUND OF THE INVENTION

Mass spectrometry is an analytical technique for accurate determination of molecular weights, the identification of chemical structures, the determination of the composition of mixtures, and qualitative elemental analysis. In operation, a mass spectrometer generates ions of sample molecules under investigation, separates the ions according to their mass-to-charge ratio, and measures the relative abundance of each ion.

Time-of-flight (TOF) mass spectrometers separate ions according to their mass-to-charge ratio by measuring the time it takes generated ions to travel to a detector. TOF mass spectrometers are advantageous because they are relatively simple, inexpensive instruments with virtually unlimited mass-to-charge ratio range. TOF mass spectrometers have potentially higher sensitivity than scanning instruments because they can record all the ions generated from each ionization event. TOF mass spectrometers are particularly useful for measuring the mass-to-charge ratio of large organic molecules where conventional magnetic field mass spectrometers lack sensitivity. The prior art technology of TOF mass spectrometers is shown, for example, in U.S. Pat. Nos. 5,045,694 and 5,160,840 specifically incorporated by reference herein.

TOF mass spectrometers include an ionization source for generating ions of sample material under investigation. The ionization source contains one or more electrodes or electrostatic lenses for accelerating and properly directing the ion beam. In the simplest case the electrodes are grids. A detector is positioned a predetermined distance from the final grid for detecting ions as a function of time. Generally, a drift region exists between the final grid and the detector. The drift region allows the ions to travel, in free flight, a predetermined distance before they impact the detector.

The flight time of an ion accelerated by a given electric potential is proportional to its mass-to-charge ratio. Thus the time-of-flight of an ion is a function of its mass-to-charge ratio, and is approximately proportional to the square root of the mass-to-charge ratio. Assuming the presence of only singly charged ions, the lightest group of ions reaches the detector first and are followed by groups of successively heavier mass groups.

In practice, however, ions of equal mass and charge do not arrive at the detector at exactly the same time. This occurs primarily because of the initial temporal, spatial, and kinetic energy distributions of generated ions. These initial distributions lead to broadening of the mass spectral peaks. The broadened spectral peaks limits the resolving power of TOF spectrometers.

The initial temporal distribution results from the uncertainty in the time of ion formation. The time of ion formation may be made more certain by utilizing pulsed ionization techniques such as plasma desorption and laser desorption. These techniques generate ions during a very short period of time.

An initial spatial distribution results from ions not being generated in a well-defined plane perpendicular to the flight axis. Ions produced from gas phase samples have the largest initial spatial distributions. Desorption techniques, such as plasma desorption or laser desorption ions, result in the smallest initial spatial distributions because ions originate from well defined areas on the sample surface and the initial spatial uncertainty of ion formation is negligible. The initial energy distribution results from the uncertainty in the energy of the ions during formation. A variety of techniques have been employed to improve mass resolution by compensating for the initial kinetic energy distribution of the ions. Two widely used techniques use an ion reflector (also called ion mirror or reflectron) and pulsed ion extraction.

Pulsed ionization such as plasma desorption (PD) ionization and laser desorption (LD) ionization generate ions with minimal uncertainty in space and time, but relatively broad initial energy distributions. Conventional LD typically employs sufficiently short pulses (frequently less than 10 nanoseconds) to minimize temporal uncertainty. However, in some cases, ion generations may continue for some time after the laser pulse terminates causing loss of resolution due to temporal uncertainty. Also, in some cases, the laser pulse generating the ions is much longer than the desired width of mass spectral peaks (for example, several IR lasers). The longer pulse length can seriously limit mass resolution. The performance of LD may be substantially improved by the addition of a small organic matrix molecule to the sample material, that is highly absorbing, at the wavelength of the laser. The matrix facilitates desorption and ionization of the sample. Matrix-assisted laser desorption/ionization (MALDI) is particularly advantageous in biological applications since it facilitates desorption and ionization of large biomolecules in excess of 100,000 Da molecular mass while keeping them intact.

In MALDI, samples are usually deposited on a smooth metal surface and desorbed into the gas phase as the result of a pulsed laser beam impinging on the surface of the sample. Thus, ions are produced in a short time interval, corresponding approximately to the duration of the laser pulse, and in a very small spatial region corresponding to that portion of the solid matrix and sample which absorbs sufficient energy from the laser to be vaporized. This would very nearly be the ideal source of ions for time-of-flight (TOF) mass spectrometry if the initial ion velocities were also small. Unfortunately, this is not the case. Rapid ablation of the matrix by the laser produces a supersonic jet of matrix molecules containing matrix and sample ions. In the absence of an electrical field, all of the molecular and ionic species in the jet reach nearly uniform velocity distributions as the result of frequent collisions which occur within the jet.

The ion ejection process in MALDI has been studied by several research groups. R. C. Beavis, B. T. Chait, *Chem. Phys. Lett.,* 181, 1991, 479. J. Zhou, W. Ens, K. G. Standing, A. Verentchikov, *Rapid Commun. Mass Spectrom.,* 6, 1992, 671–678. In the absence of an electrical field, the initial velocity distributions for peptide and protein ions produced by MALDI are very nearly independent of mass of the analyte and laser intensity. The average velocity is about 550 m/sec with most of the velocity distribution between 200 and 1200 m/sec. The velocity distribution for matrix ions is essentially identical to that of the peptides and proteins near threshold irradiance, but shifts dramatically toward higher velocities at higher irradiance. The total ion intensity increases rapidly with increasing laser irradiance, ranging from about $10^4$ ions per shot near threshold to more than $10^4$ at higher irradiance. In the presence of an electrical field, the ions show an energy deficit due to collisions between ions and neutrals. This energy deficit increases with both laser intensity and electrical field strength and is higher for higher mass analyte ions than it is for matrix ions.

The observation that the initial velocity distribution of the ions produced by MALDI is nearly independent of mass implies that the width of the initial kinetic energy distribution is approximately proportional to the square root of the mass as well as the energy deficit arising from collisions with neutral particles in the accelerating field. Thus the mass resolution, at high mass, in conventional MALDI decreases with the increasing mass-to-charge ratio of the ions. Use of high acceleration potential (25–30 kV) increases the resolution at high mass in direct proportion to the increase in accelerating potential.

The adverse effect of the initial kinetic energy distribution can be partly eliminated by pulsed ion extraction. Pulsed or delayed ion extraction is a technique whereby a time delay is introduced between the formation of the ions and the application of the accelerating field. During the time lag, the ions move to new positions according to their initial velocities. By properly choosing the delay time and the electric fields in the acceleration region, the time of flight of the ions can be adjusted so as to render the flight time independent of the initial velocity to the first order.

Considerable improvements in mass resolution were achieved by utilizing pulsed ion extraction in a MALDI ion source. Researchers reported improved resolution as well as fast fragmentation of small proteins in J. J. Lennon and R. S. Brown, Proceedings of the 42nd ASMS Conference on Mass Spectrometry and Allied Topics, May 29–Jun. 3, 1994, Chicago, Ill., p. 501. Also, researchers reported significant resolution enhancement when measuring smaller synthetic polymers on a compact MALDI instrument with pulsed ion extraction in Breuker et al., 13th International Mass Spectrometry Conference, Aug. 29–Sep. 3, 1994. Breuker et al., 13*th International Mass Spectrometry Conference*, Aug. 29–Sep. 3, 1994, Budapest, Hungary. In addition, researchers reported considerably improved mass resolution on small proteins with a pulsed ion extraction MALDI source in Reilly et al. Rapid Commun., Mass Spectrometry, 8, 1994, 865–868. S. M. Colby, T. B. King, J. P. Reilly, *Rapid Commun. Mass Spectrom.,* 8, 1994, 865–868.

Ion reflectors (also called ion mirrors and reflectrons) are also used to compensate for the effects of the initial kinetic energy distribution An ion reflector is positioned at the end of the free-flight region. An ion reflector consists of one or more homogeneous, retarding, electrostatic fields. As the ions penetrate the reflector, with respect to the electrostatic fields, they are decelerated until the velocity component in the direction of the field becomes zero. Then, the ions reverse direction and are accelerated back through the reflector. The ions exit the reflector with energies identical to their incoming energy but with velocities in the opposite direction. Ions with larger energies penetrate the reflector more deeply and consequently will remain in the ion reflector for a longer time. In a properly designed reflector, the potentials are selected to modify the flight paths of the ions such that ions of like mass and charge arrive at the detector at the same time regardless of their initial energy.

The performance of a mass spectrometer is only partially defined by the mass resolution. Other important attributes are mass accuracy, sensitivity, signal-to-noise ratio, and dynamic range. The relative importance of the various factors defining overall performance depends on the type of sample and the purpose of the analysis, but generally several parameters must be specified and simultaneously optimized to obtain satisfactory performance for a particular application.

Unfortunately, utilizing the prior art techniques, the performance of TOF mass spectrometers is inadequate for analysis of many important classes of compounds. These inadequacies are particularly apparent with MALDI. There are several mechanisms that may limit the performance of TOF mass spectrometry in addition to the loss of mass resolution associated with the initial kinetic energy distribution. An excess of generated matrix ions may cause saturation of the detector. Due to a long recovery time of many detectors, saturation seriously inhibits the true reproduction of the temporal profile of the incoming ion current which constitutes essentially the TOF spectrum.

Fragmentation processes have been observed to proceed at three different time scales in MALDI TOF, E. Nordhoff, et al., J. Mass Spectrom., 30 1995, 99–112. Extremely fast fragmentation can take place essentially during the time of the ionization event. This process is referred to as prompt fragmentation. The fragment ions will give a correlated ion signal in a continuous ion extraction MALDI TOF measurement, that is, fragment ions behave exactly as if they were present in the sample. Fragmentation can also take place at a somewhat lower rate during the acceleration stage (typically with less than one μsec characteristic time). This kind of fragmentation is referred to as fast fragmentation. High energy collisions (more energetic than thermal collisions) between ions and neutrals can also contribute to fast fragmentation. These collisions are particularly frequent in the early stage of ion acceleration when the ablated material forms a dense plume. Fragment ions from the fast fragmentation processes, as opposed to prompt fragments, contribute to uncorrelated noise (chemical noise) since they will be accelerated to a wide range of kinetic energies unlike the original sample ions which are accelerated to one well-defined kinetic energy.

Fragmentation of sample ions may also occur in the free-flight region which occurs on a longer time scale comparable with the flight time of the ions. This may or may not be desirable depending on the particular type of data that is required from the time-of-flight mass spectrometer. Generally, fragmentation decreases the intensity of the signal due to the intact molecular ions. In mixture analysis, these fragment ions can produce significant chemical noise which interferes with detection of the signals of interest. Also, fragmentation within a reflector further reduces the intensity of the signal of interest and further increases the interfering background signal.

When fragmentation occurs in a drift region, except for the very small relative velocity of the separating fragments, both the ion and neutral fragment continue to move with nearly the same velocity as the intact ions and arrive at the end of the field-free region at essentially the same time, whether or not fragmentation has occurred. Thus in a simple TOF analyzer, without reflector, neither the resolution nor the sensitivity is seriously degraded by fragmentation after acceleration.

On the other hand, in the reflecting analyzer the situation is quite different. Fragment ions have essentially the same velocity as the intact ions, but having lost the mass of the neutral fragment, have proportionally lower energy. Thus the fragment ions penetrate a shorter distance into the reflecting field and arrive earlier at the detector than do the corresponding intact ions. By suitable adjustment of the mirror potentials these fragment ions may be focused to produce a high quality post-source decay (PSD) spectrum which can be used to determine molecular structure.

It is therefore a principal object of this invention to improve the performance of time-of-flight mass spectrometers, particularly in regard to applications involving production of ions from surfaces, by improving resolution, increasing mass accuracy, increasing signal intensity, and reducing background noise. It is another object to reduce the matrix ion signal in MALDI time-of-flight mass spectrometers. Another objective is to provide TOF mass spectrometers suitable for fast sequencing of biopolymers such as nucleic acids, peptides, proteins, and polynucleotides by the analysis of chemically or enzymatically generated ladder mixtures. Still another objective is to utilize fast fragmentation processes for obtaining structural information on biomolecules such as oligonucleotides, carbohydrates, and glycoconjugates. Yet, another objective is to control the extent of fast fragmentation by selecting the most appropriate experimental conditions in a pulsed ion extraction TOF mass spectrometer.

SUMMARY OF THE INVENTION

The invention features a time-of-flight (TOF) mass spectrometer for measuring the mass-to-charge ratio of ions generated from a sample. The mass spectrometer includes a sample holder for providing a source of ions from a liquid or solid sample and an ionizer for ionizing the source of ions to form sample ions. The mass spectrometer also includes a means for controllably generating a preselected non-periodic non-zero electric field which imposes a force on the sample ions prior to extracting the ions and a means for generating a different electric field to extract the ions. The ionizer may be a laser which generates a pulse of energy.

Alternatively, the mass spectrometer includes a sample holder, a means for ionizing a sample disposed on the holder to generate sample ions, and a first element spaced apart from the sample holder. The mass spectrometer may include a drift tube and a detector. The ionizer may be a laser which generates a pulse of energy for irradiating and thereby ionizing a sample disposed on the holder. The first element may be a grid or an electrostatic lens. A power source is electrically coupled to the first element and the holder. The source generates a variable potential to each of the first element and the holder wherein the first element and holder potentials are independently variable. The potential on the first element together with the potential on the holder defines an electric field between the holder and the first element. The mass spectrometer may also include a circuit for comparing the voltage between the holder and the first element.

The mass spectrometer may include a second element for producing an electric field spaced apart from the first element for accelerating sample ions. The second element is connectable to an electrical potential independent of the potential on the holder and the first element. The second element may be connected to ground or may be connected to the power supply. The second element may be a grid or an electrostatic lens. The potential on the second element together with the potential on the first element defines an electric field between the first and second elements. The mass spectrometer may also include an ion reflector spaced apart from the first element which compensates for energy distribution of the ions after acceleration.

The mass spectrometer may include a power supply, a fast high voltage switch comprising a first high voltage input, a second high voltage input, a high voltage output connectable to the first or second inputs; and a trigger input for operating the switch. The output is switched from the first input to the second input for a predetermined time when a trigger signal is applied to the trigger input. The first and second high voltage inputs are electrically connected to at least a 1 kV power supply and the switch has a turn-on rise time less than 1 μs.

The mass spectrometer may include a delay generator responsive to the laser output pulse of energy with an output operatively connected to the trigger input of the switch which generates a trigger signal to operate the fast high voltage switch in coordination with the pulse of energy. The laser may initiate timing control by means of a photodetector responsive to the laser pulse, or the laser itself may include a circuit which generates an electrical signal synchronized with the pulse of energy (for example, a Pockels cell driver). Alternately, the delay generator may initiate both the pulse of energy and the trigger input.

The mass spectrometer must include an ion detector for detecting ions generated by the ionizer. The mass spectrometer may also include a guide wire to limit the cross sectional area of the ion beam so that a small area detector can be used. The mass spectrometer may include a computer interface and computer for controlling the power sources and the delay generator, and a computer algorithm for calculating the optimum potentials and time delay for a particular application.

The present invention also features a method of determining the mass-to-charge ratio of molecules in a sample by time-of-flight mass spectrometry. The method includes applying a first potential to a sample holder. A second potential is applied to a first element spaced apart from the sample holder which, together with the potential on the sample holder, defines a first electric field between the sample holder and the first element. The potential on the first element is independently variable from the potential on the sample holder.

A sample proximately disposed to the holder is ionized to generate sample ions. The method may include ionizing the sample with a laser or a light source producing a pulse of energy. At least one of the first or second potentials are varied at a predetermined time subsequent to the ionization event to define a second electric field between the sample holder and the first element which extracts the ions for a time-of-flight measurement. The optimum time delay between the ionization pulse and application of the second electrical field (the extraction field) depends on a number of factors, including the distance between the sample surface and the first element, the magnitude of the second electrical field, the mass-to-charge ratio of sample ions for which optimum resolution is required, and the initial kinetic energy of the ion. The method may also include a computer algorithm for calculating the optimum values of the time delay and electric fields, and use of a computer and computer interface to automatically adjust the outputs of the power sources and the delay generator.

The method may include independently varying the potential on the first element from the potential on the sample holder. The potential on the first element may be independently varied from the potential on the sample holder to establish a retarding electric field to spatially separate ions by mass-to-charge ratio prior to ion extraction.

The method may include the step of applying a potential to a second element spaced apart from the first element which, together with the potential on the first element, defines an electric field between the first and second elements for accelerating the ions. The method may also include analyzing a sample comprising at least one compound of biological interest selected from the group consisting of DNA, RNA, polynucleotides and synthetic variants thereof or at least one compound of biological interest selected from the group consisting of peptides, proteins, PNA, carbohydrates, and glycoproteins. The sample may include a matrix substance absorbing at the wavelength of the laser pulse to facilitate desorption and ionization of the one or more molecules.

Utilizing this method improves the resolution of time-of-flight mass spectrometers by reducing the effect of the initial temporal and energy distributions on the time-of-flight of the sample ions. The method may also include the step of energizing an ion reflector spaced apart from the first or second element. Application of the reflector provides a higher order correction for energy spread in the ion beam, and when included in this method provides even higher mass resolution.

The present invention also features a method of improving resolution in laser desorption/ionization time-of-flight mass spectrometry by reducing the number of high energy collisions during ion extraction. A potential is applied to a sample holder comprising one or more molecules to be analyzed. A potential is applied to a first element spaced apart from the sample holder which, together with the potential on the sample holder, defines a first electric field between the sample holder and the first element. A sample proximately disposed to the holder is ionized with a laser, which generates a pulse of energy to form a cloud of ions.

A second potential is applied at either the sample holder or the first element at a predetermined time subsequent to ionization which, together with the potential on the sample holder or first element, defines a second electric field between the sample and the first element. The second electric field extracts the ions after the predetermined time. The predetermined time is long enough to allow the cloud of ions and neutrals to expand enough to substantially reduce the number of high energy collisions when the extracting field is activated. The predetermined time may be greater than the time it takes the mean free path of the ions in the plume to become greater than the size of the accelerating region.

The method may also include the step of applying a potential to a second element spaced apart from the first element which, together with the potential on the first element, defines an electric field between the first and second elements for accelerating the ions.

Parameters such as the magnitude and direct ion of the first and second electric fields, and the time delay between the ionization pulse and application of the second electric field are chosen so that the delay time is long enough to allow the plume of neutrals and ions produced in response to application of the laser pulse to expand into the vacuum sufficiently so that further collisions between ions and neutrals are unlikely. Parameters are also chosen to insure that sample ions of a selected mass are detected with optimum mass resolution. The parameters may be determined manually or by use of a computer, computer interface, and computer algorithm.

The method may also include analyzing a sample comprising at least one compound of biological interest selected from the group consisting of DNA, RNA, polynucleotides and synthetic variants thereof or at least one bio-molecule selected from the group consisting of peptides, proteins, PNA, carbohydrates, glycoconjugates and glycoproteins. The sample may include a matrix substance absorbing at the wavelength of the laser pulse to facilitate desorption and ionization of the one or more compounds.

The method may also include the step of energizing an ion reflector spaced apart from the first or second element. Application of the reflector provides a higher order correction for energy spread in the ion beam, and when included in this method provides even higher mass resolution.

The present invention also features a method of reducing the matrix ion signal in matrix-assisted laser desorption/ionization time-of-flight mass spectrometry. The method includes incorporating a matrix molecule into a sample. A first potential is applied to the sample holder. A potential is applied to a first element spaced apart from the sample holder to create a first electric field between the sample holder and the first element. A sample proximately disposed to the holder is irradiated with a laser which produces a pulse of energy. The matrix absorbs the energy and facilitates desorption and ionization of the sample and the matrix. The first electric field is retarding and thus accelerates ions toward the sample surface.

A second potential is applied to the sample holder at a predetermined time, subsequent to the pulse of energy, which creates a second electric field between the sample holder and the first element to accelerate ions away from the sample surface. The first electric field is chosen to retard the ions generated from the sample. This field decelerates and directs the ions back toward the sample surface.

The method may include the step of applying a potential to a second element spaced apart from the first element which creates an electric field between the first and second elements to accelerate the ions. Parameters such as the magnitude and direction of the first and second electric fields and the time delay between the ionization pulse and the application of the second electric field are chosen so that matrix ions having a mass less than a selected mass are suppressed while sample ions having a mass greater than a selected mass are detected with optimum mass resolution. The parameters may be determined manually or by use of a computer, computer interface, and computer algorithm.

The method may include analyzing a sample comprising at least one biological molecule selected from the group consisting of DNA, RNA, polynucleotides and synthetic variants thereof or at least one biological molecule selected from the group consisting of peptides, proteins, PNA, carbohydrates, glycoconjugates and glycoproteins.

The method may also include the step of energizing an ion reflector spaced apart from the first or second element. Application of the reflector provides a higher order correction for energy spread in the ion beam, and when included in this method provides even higher mass resolution.

The present invention also features a method of reducing background chemical noise in matrix-assisted laser desorption/ionization time-of-flight mass spectrometry by allowing time for fast fragmentation processes to complete prior to ion extraction. A matrix molecule is incorporated into a sample comprising one or more molecules to be analyzed so that the matrix substance facilitates intact desorption and ionization of the one or more molecules. A potential is applied to the sample holder. A potential is applied to a first element spaced apart from the sample holder which, together with the potential on the sample holder, defines a first electric field between the sample holder and the first element.

A sample proximately disposed to the holder is ionized with a laser that generates a pulse of energy which is absorbed by the matrix molecule. A second potential is applied to the sample holder at a predetermined time subsequent to the ionization which, together with the potential on the first element, defines a second electric field between the sample and the first element to extract the ions. The predetermined time is long enough to substantially allow all fast fragmentation processes to complete.

The method may include the step of applying a potential to a second element spaced apart from the first element which, together with the potential on the first element, defines an electric field between the first and second elements for accelerating the ions.

Parameters such as the magnitude and direction of the first and second electric fields, and the time delay between the ionization pulse and application of the second electric field are chosen so that the time delay is long enough to allow fast fragmentation processes to complete. The parameters are also chosen so that the selected mass is detected with optimum mass resolution. The parameters may be determined manually or by use of a computer, computer interface, and computer algorithm.

The method may include analyzing a sample comprising at least one bio molecule selected from the group consisting of DNA, RNA, polynucleotides and synthetic variants thereof or at least one bio molecule selected from the group consisting of peptides, proteins, PNA, carbohydrates, glycoconjugates and glycoproteins.

The method may also include the step of energizing an ion reflector spaced apart from the first or second element. Application of the reflector provides a higher order correction for energy spread in the ion beam, and when included in this method provides even higher mass resolution.

The present invention also features a method of improving resolution in long-pulse laser desorption/ionization time-of-flight mass spectrometry. A first potential is applied to a sample holder. A second potential is applied to a first element spaced apart from the sample holder which, together with the potential on the sample holder, defines a first electric field between the sample holder and the first element. A sample proximately disposed to the holder is ionized with a long pulse length laser. The time duration of the pulse of energy may be greater than 50 ns.

The potential on the first element with respect to the sample holder may be more positive for measuring positive ions and more negative for measuring negative ions to reduce the spatial and velocity spreads of ions prior to ion extraction. At least one of the first or second potentials is varied at a predetermined time subsequent to ionization to define a second different electric field between the sample holder and the first element which extracts ions for a time-of-flight measurement. The predetermined time may be greater than the duration of the laser pulse.

The method may include the step of applying a potential to a second element spaced apart from the first element which, together with the potential on the first element, defines an electric field between the first and second elements for accelerating the ions.

The sample may comprise a matrix substance absorbing at the wavelength of the laser pulse to facilitate desorption and ionization of sample molecules. The sample may also comprise at least one compound of biological interest selected from the group consisting of DNA, RNA, polynucleotides and synthetic variants thereof or at least one compound of biological interest selected from the group consisting of peptides, proteins, PNA, carbohydrates, glycoconjugates and glycoproteins.

The present invention also features a method of generating sequence defining fragment ions of biomolecules using matrix-assisted laser desorption/ionization time-of-flight mass spectrometry. The method includes incorporating a matrix molecule into a sample comprising one or more molecules to be analyzed, to facilitate desorption, ionization, and excitation of the molecule. A potential is applied to the sample. A potential is applied to a first element spaced apart from the sample which, together with the potential on the sample, defines a first electric field between the sample and the first element.

The molecules are ionized and fragmented with a laser which generates a pulse of energy substantially corresponding to an absorption energy of the matrix. A second potential is applied to the sample at a predetermined time subsequent to the ionization which, together with the potential on the first element, defines a second electric field between the sample and the first element. The second electric field extracts the ions after the predetermined time.

The method may include the step of applying a potential to a second element spaced apart from the first element which, together with the potential on the first element, defines an electric field between the first and second elements for accelerating the ions.

Parameters such as the magnitude and direction of the first and second electric fields, and the time delay between the ionization pulse and application of the second electric field are chosen so that the time delay is long enough to allow for the completion of fast fragmentation processes. These parameters are also chosen to detect the selected mass with optimum mass resolution. The parameters may be determined manually or by use of a computer, computer interface, and computer algorithm.

The method may include the step of detecting the mass-to-charge ratio of the sequence specific fragments generated and the step of identifying a sequence of at least one kind of biomolecule in the sample wherein the biomolecule is selected from the group consisting of DNA, RNA, polynucleotides and synthetic variants thereof or at least one compound of biological interest selected from the group consisting of peptides, proteins, PNA, carbohydrates, glycoconjugates and glycoproteins.

The method may also include the step of increasing the yield of fragments generated by increasing the energy transfer to the biomolecule during ionization. The energy transfer may be increased by selecting a laser wavelength at which the biomolecule absorbs. Yield of fragment ions may be increased by incorporating an additive in the matrix. The additive may or may not absorb at the wavelength of the laser but it is not effective as a matrix in itself. The additive may facilitate the transfer of energy from the matrix to the sample.

The matrix may be selected to specifically promote fragmentation of biomolecules. The biomolecule may be an oligonucleotide and the matrix may comprise at least one of 2,5-dihydroxybenzoic acid and picolinic acid. The biomolecule may be a polynucleotide.

The method may also include the step of energizing an ion reflector spaced apart from the first or second element. Application of the reflector provides a higher order correction for energy spread in the ion beam, and when included in this method provides even higher mass resolution.

The present invention also features a novel form of sample holder for the claimed mass spectrometer as fully described and claimed in U.S. application Ser. No. 08/446, 055 (attorney docket No. SYP-115, filed concurrently herewith) specifically incorporated herein by reference. Briefly, the sample holder comprises spatially separate areas adapted to hold differing concentration ratios of polymer sample and hydrolyzing agent. After a suitable incubation period during which the hydrolyzing agent hydrolyzes inter monomer bonds in the polymer sample in each area, a plurality, typically all, of the areas containing the species are ionized, typically serially, in the mass spectrometer, and data representative of the mass-to-charge ratios of the species in the areas are obtained.

In other embodiments, the invention provides a method for obtaining sequence information about a polymer comprising a plurality of monomers of known mass as fully described and claimed in U.S. application Ser. No. 08/447, 175 (attorney docket No. SYP-114, filed concurrently herewith) specifically incorporated herein by reference. One skilled in the art first provides a set of fragments, created by the hydrolysis of the polymer, each set differing by one or more monomers. The difference between the mass-to-charge ratio of at least one pair of fragments is determined. One then asserts a mean mass-to-charge ratio which corresponds to the known mass-to-charge ratio of one or more different monomers. The asserted mean is compared with the measured mean to determine if the two values are statistically different with a desired confidence level. If there is a statistical difference, then the asserted mean difference is not assignable to the actual measured difference. In some embodiments, additional measurements of the difference between a pair of fragments are taken, to increase the accuracy of the measured mean difference. The steps of the method are repeated until one has asserted all desired $\mu$s for a single difference between one pair of fragments.

BRIEF DESCRIPTION OF THE DRAWINGS

The foregoing and other objects, features and advantages of the invention will become apparent from the following more particular description of preferred embodiments of the invention, as illustrated in the accompanying drawings. The drawings are not necessarily to scale, emphasis instead being placed on illustrating the principles of the present invention.

FIG. 4*a* is a spectrum of a DNA 22mer sample recorded by a conventional MALDI TOF mass spectrometer. FIG. 4*b* is a spectrum of a DNA 22mer sample recorded with a MALDI TOF mass spectrometer incorporating the principles of this invention.

DETAILED DESCRIPTION

Figure 1:
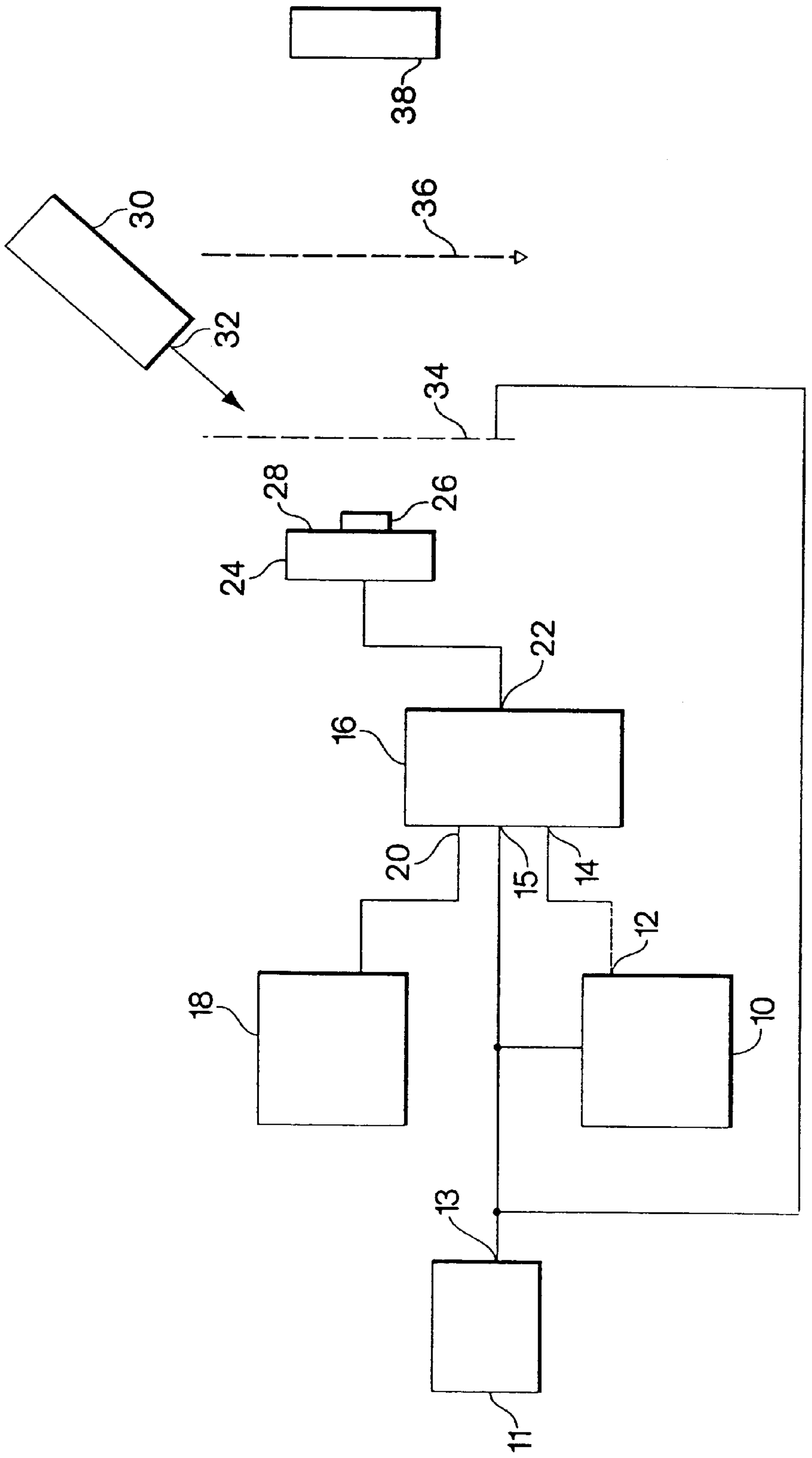
Fig. 1 (Prior Art)
FIG. 1 is a schematic diagram of prior art pulsed ion two-stage acceleration laser desorption/ionization time-of-flight mass spectrometer.

FIG. 1 is a schematic diagram of a prior art pulsed ion two-stage acceleration laser desorption/ionization time-of-flight mass spectrometer. A high voltage power supply 11 generates a variable high voltage at an output 13. A second high voltage power supply 10 generates a variable high voltage at an output 12 which is referenced to the output 13 of high voltage power supply 11. The power supply outputs 12 and 13 are electrically coupled to inputs 14 and 15 of a pulse generator 16. A control circuit 18 for generating a trigger signal to control the output of the pulse generator 16 is electrically or optically connected to the trigger input 20 of the pulse generator 16. The pulse generator 16 passes the high voltage output of the power supply 11 to a pulse generator output 22 when the trigger input is inactive. The pulse generator generates a high voltage pulse whose amplitude is determined by the high voltage output of high voltage power supply 10 at the pulse generator output 22 for a predetermined time when the trigger input is active.

The pulse generator output 22 is electrically coupled to a holder 24. A sample under investigation 26 is deposited on a smooth surface 28 of the holder 24. The holder 24 is an electrically conductive body on which the sample 26 is typically located. A laser 30 for irradiating the sample 26 with a pulse of energy is positioned with an output 32 directed at the sample 26. Molecules in the sample 26 are ionized and desorbed into the gas phase as the result of a pulsed laser beam impinging on the surface of the sample 26. A matrix material highly absorbing at the wavelength of the laser 30 may be added to the sample in order to facilitate desorption and ionization of the sample 26. Other means for causing sample material to be ionized such as plasma desorption, particle bombardment, etc. also may be used.

The power supply output 13 is also coupled to a first element 34 spaced apart from the holder 24. The first element 34 may be a grid or an electrostatic lens. The potential on the holder 24 and on the first element 34 defines an electric field between the holder 24 and the first element 34 A second element 36 spaced apart from the first element 34 is electrically connected to a potential which may be ground. The second element may also be a grid or an electrostatic lens. A detector 38 spaced apart from the second element 36 detects ionized sample material as a function of time.

In operation, the trigger input 20 is inactive before and during the time when the laser 30 irradiates the sample 26 with a pulse of energy. The potential on the holder 24 and on the first element 34 are both equal to the power supply potential. At a predetermined time subsequent to the laser pulse, the trigger input 20 becomes active and the pulse generator 16 produces a high voltage pulse of a predetermined amplitude on the holder. During the pulse, the potential on the holder 24 exceeds the potential on the first element 34 in either a positive or a negative direction depending whether positive or negative ions are under investigation. The electric field between the holder 24 and the first element 34 becomes non-zero and the ions are accelerated towards the second element 36 and the detector 38.

Thus, with the prior art pulsed ion LD TOF mass spectrometer, sample ions are generated in a region in which the same potential is applied to both the holder 24 and the first element 34 prior to ion extraction. Ions are extracted from the field free region with the application of a pulse of a predetermined amplitude at a predetermined time delay subsequent to the initial ion formation. Initial kinetic energy effects may be reduced by properly choosing the predetermined pulse amplitude and time delay.

Figure 2:
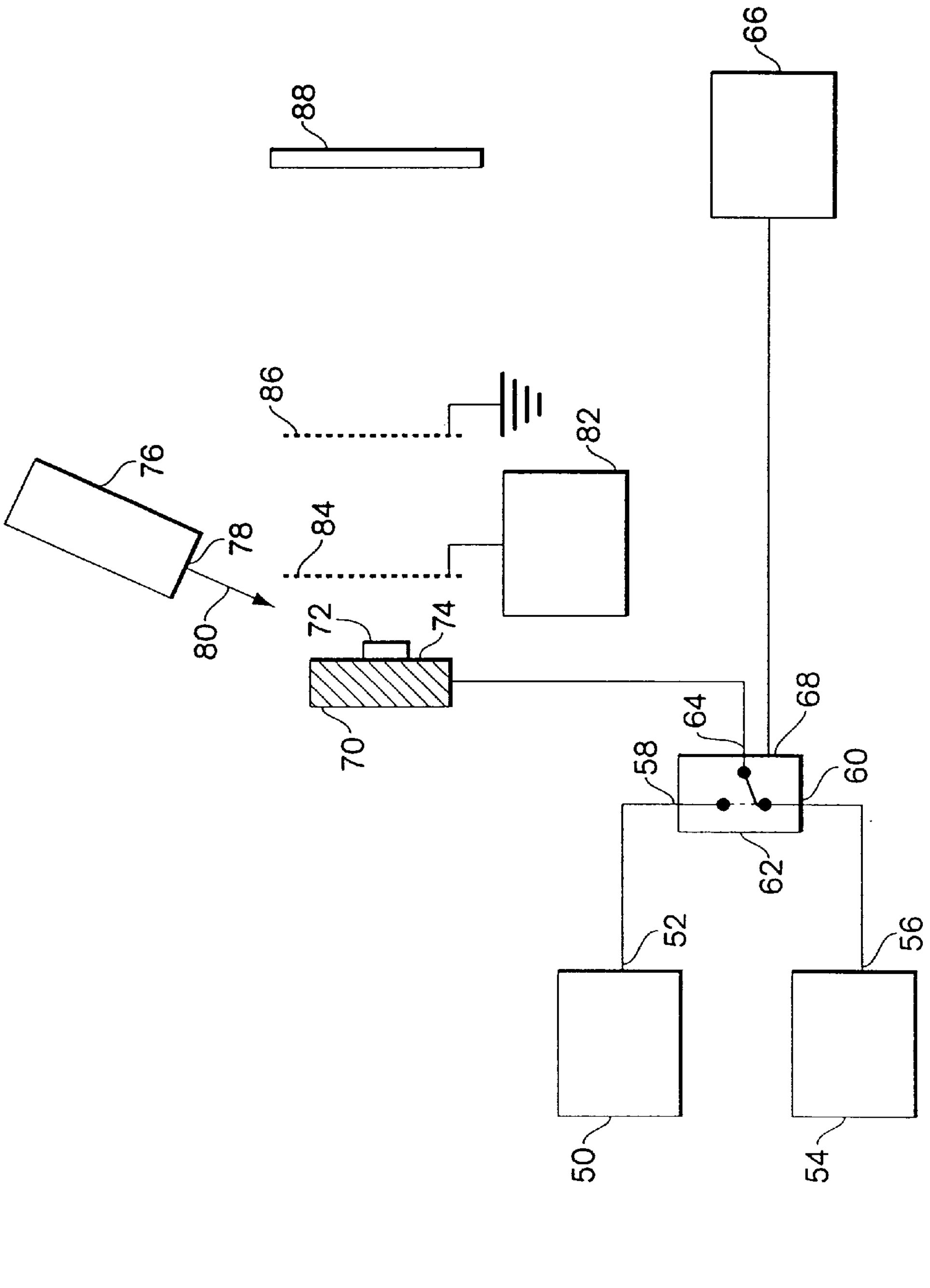
FIG. 2 is a schematic diagram of a laser desorption/ionization time-of-flight mass spectrometer incorporating certain principles of this invention.

FIG. 2 is a schematic diagram of a laser desorption/ionization time-of-flight mass spectrometer incorporating principles of this invention. A first high voltage power supply 50 generates a first variable high voltage at a first output 52. A second high voltage power supply 54 generates a second variable high voltage at a second output 56. The first and second power supplies may be independent, manually controlled or programmable power supplies or may be a single multi-output programmable power supply.

The first and second power supply outputs are electrically connected to a first input 58 and second input 60 of a fast high voltage switch 62. An output 64 of the switch is connectable between the first 58 and second 60 switch inputs. A control circuit 66 for generating a control signal to operate the switch is electrically connected to a trigger input 68 of the switch. The output of the switch 64 is electrically coupled to a holder 70.

The holder 70 is an electrically conductive body on which the sample is located. A sample 72 under investigation is disposed on a smooth surface 74 of the holder 70. An insulating layer (not shown) could be interposed between the sample and holder. In an alternative embodiment, the sample is orthogonally located with respect to an electric field generated by the holder.

A laser 76 for irradiating the sample 72 with a pulse of energy is positioned with an output 78 directed at the sample 72. The sample 72 is ionized and desorbed into the gas phase as the result of a pulsed laser beam 80 impinging on the surface of the sample 72. A matrix material highly absorbing at the wavelength of the laser 76 may be added to the sample 72 in order to facilitate desorption and ionization of the sample 72. Other means for causing sample material to be ionized and desorbed such as plasma desorption, particle bombardment, etc. also may be used.

A third power supply 82 is electrically connected to a first element 84 spaced apart from the holder 70 and generates a third high voltage. The first element 84 may be a grid or an electrostatic lens. The potential on the holder 70 and on the first element 84 defines an electric field between the holder 70 and the first element 84. A second element 86 spaced apart from the first element 84 is electrically connected to a potential which may be ground. The second element 86 may also be a grid or an electrostatic lens. A detector 88 spaced apart from the second element 88 detects ionized sample material as a function of time.

In operation, the trigger input 68 is inactive before and during the time when the laser 76 irradiates the sample 72 with a pulse of energy. The potential on the holder 70 is equal to the first high voltage generated by the first high voltage power supply 50. The potential on the first element is equal to the third high voltage generated by the third high voltage power supply 82. If the first high voltage is different from the third high voltage, there will be a non-zero static electric field between the holder 70 and the first element 84.

At a predetermined time subsequent to the laser pulse, the control circuit 66 causes the trigger input 68 to become active. The switch 62 rapidly disconnects the first high voltage power supply 50 from the holder 70 and rapidly connects the second high voltage power supply 54 to the holder 70 for a predetermined time. The potential on the holder 70 rapidly changes from the first high voltage to the second high voltage. The second high voltage exceeds the first and third high voltages in either a positive or a negative direction, depending whether positive or negative ions are under investigation. Because of the higher potential on the holder 70, an electric field between the holder 70 and the first element 84 is established which extracts and accelerates the ions towards the second element 86 and the detector 88.

Thus, with a laser desorption/ionization time-of-flight mass spectrometer incorporating principles of this invention, there may be a non-zero non-periodic electric field in the region between the holder 70 and the first element 84 prior to ion extraction that may be varied. The mass spectrometer of this invention, therefore, allows control over the electric field experienced by generated ions both before and during ion extraction.

Figure 3:
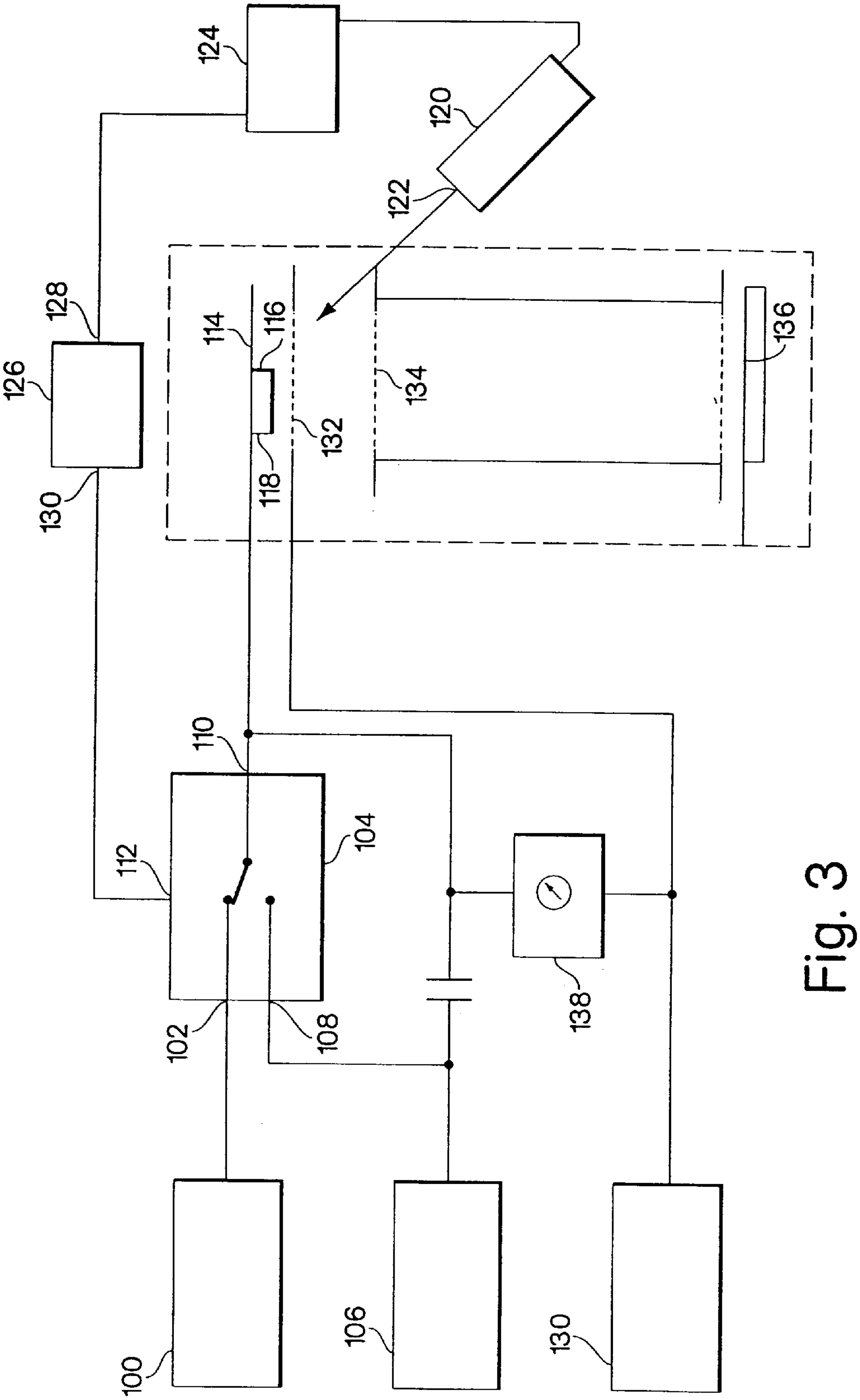
FIG. 3 is one embodiment of a laser desorption/ionization time-of-flight mass spectrometer incorporating principles of this invention.

FIG. 3 depicts one embodiment of a laser desorption time-of-flight mass spectrometer incorporating the principles of this invention. This embodiment utilizes three independent power supplies and a fast high voltage switch to independently control the potential on a sample holder and a first element before and during ion extraction.

A first power supply 100 is electrically connected to a first input 102 of a fast high voltage switch 104. The switch could be an HTS 300-02 manufactured by Behlke, available from Eurotek, Inc., Morganville, N.J., with a turn-on delay of approximately 150 ns, a risetime of approximately 20 ns, and an on-time of approximately 10 microseconds. A second power supply 106 is electrically connected to a second input 108 of the switch 104. An output 110 of the switch 104 is connectable to either the first 102 or second 108 inputs but is normally connected to the first input 102 absent a trigger signal. A trigger input 112 causes the switch 104 to disconnect the first power supply 100 from the switch output 110 and to connect the second power supply 106 to the switch output 110 for a predetermined time. The output of the switch 110 is electrically connected to a sample holder 114. A sample 116 under investigation is deposited on a smooth metal surface 118 of the holder such that it is electrically coupled to the holder 114. A matrix material highly absorbing at the wavelength of a laser 120 used for ionization may be added to the sample 116 in order to facilitate desorption and ionization of the sample 116.

A laser 120 for irradiating the sample with a pulse of energy is positioned with an output 122 directed at the sample 116. The laser pulse is detected by a photodetector 124 for generating an electrical signal synchronously timed to the pulse of energy. A delay generator 126 has an input 128 responsive to the synchronously timed signal and an output 130 electrically connected to the trigger input of the switch 112. The delay generator 120 produces a trigger signal delayed by a predetermined time with respect to the synchronously timed signal. Thus in coordination with the pulse of energy, the switch 104 will disconnect the first power supply 100 from the switch output 110 and connect the second power supply 106 to the switch output 110 for a predetermined time.

A third power supply 130 which generates a third high voltage is electrically connected to a first element 132 spaced apart from the holder 114. The first element 132 may be a grid or an electrostatic lens. The potential on the holder 114 and on the first element 132 defines an electric field between the holder 114 and the first element 132. A second element 134 spaced apart from the first element is electrically connected to a potential which may be ground. The second element may also be a grid or an electrostatic lens. A detector 136 such as a channel plate detector spaced apart from the second element 134 detects ionized sample material as a function of time. Note that it is the relative potential and not a particular potential of the holder 114 with respect to the first and second elements that is important to the operation of the mass spectrometer.

A comparing circuit 138 measures and compares the voltage on the first 100 and third 130 power supplies and indicates the difference between the first and third voltages. The voltage difference represents the electric field strength between the holder 114 and the first element 132 prior to ion extraction.

In operation, before the laser 120 irradiates the sample 116, the holder 114 is electrically connected to the first high voltage power supply 100 through the switch and the third high voltage power supply 130 is electrically connected to the first element 132. Thus before an ionization event, a first electric field is established between the holder 114 and the first element 132. This electric field is indicated by the comparing circuit 138 and is adjustable by varying the first and third high voltages.

To initiate the mass-to-charge measurement, the laser 120 irradiates the sample 116 with a pulse of energy. The laser 120 generates an electrical signal synchronously timed to the pulse of energy. The delay generator 126 is responsive to the signal. At a predetermined time subsequent to the signal, the delay generator 126 produces a trigger signal. The fast high voltage switch 104 is responsive to the trigger signal and causes the switch 104 to rapidly disconnect the first power supply 100 and rapidly connect the second power supply 106 to the switch output 110 for a predetermined time. During the predetermined time, the potential on the holder 114 or the first element 132 changes in magnitude creating an electric field that causes the ions to be accelerated towards the second element 134 and the detector 136.

The present invention also features a method of determining the mass-to-charge ratio of molecules in a sample by utilizing a laser desorption/ionization time-of-flight mass spectrometer which incorporates the principles of this invention. The method includes applying a first potential to a sample holder having a sample proximately disposed to the sample holder which comprises one or more molecules to be analyzed. A second potential is applied to a first element spaced apart from the sample holder which, together with the potential on the sample holder, defines a first electric field between the sample holder and the first element. The potential on the first element is independently variable from the potential on the sample holder. The sample is ionized to generate sample ions. The method may include ionizing the sample with a laser or a light source producing a pulse of energy. At least one of the first or second potentials are varied at a predetermined time subsequent to an ionization event to define a second electric field between the sample holder and the first element which extracts the ions for a time-of-flight measurement.

The optimum time delay between the ionization pulse and application of the second electrical field depends on a number of parameters including the distance between the sample surface and the first element, the magnitude of the second electrical field, the mass-to-charge ratio of sample ion for which optimal resolution is required, and the initial kinetic energy of the ion. If the first electric field is small compared to the second, the time delay which minimizes the variation in the total flight time with initial velocity is approximately given by $$\Delta=144.5d_a(m/V_a)^{1/2}[1/w+(V_o/V_a)^{1/2}] \quad (1)$$

where the time is in nanoseconds, the distance, $d_a$, between the sample and the first elements is in millimeters, the mass, m, in Daltons, the potential difference, $V_a$, is in volts, and the initial kinetic energy of the ions of mass, m, is $V_o$, in electron volts. The dimensionless parameter, w, depends upon the geometry of the TOF analyzer. The geometrical parameters of the TOF analyzer must be chosen so that w is greater than unity. For the case in which the time of flight analyzer consists only of the sample plate, a first element, a field-free drift space, and a detector, the value of w is given by $$w=d/d_a-1 \quad (2)$$

where d is the length of the field free region between the first element and the detector.

This method improves the resolution of time-of-flight mass spectrometers by reducing the effect of the initial temporal and energy distributions on the time-of-flight of the sample ions. The method may include the step of applying a potential to a second element spaced apart from the first element which, together with the potential on the first element, defines an electric field between the first and second elements for accelerating the ions.

In this case, the time delay is also given by equation one (1), but the geometric parameter w is given by $$w=(\chi/1+\chi)^{3/2}[(d/2d_a)-(d_o/d_a)(1+x)]+\chi(d_o/d_a)-1 \quad (3)$$

where $\chi=V_a/V$, with V being the potential difference between the first and second element, and $d_o$ is the distance between the first and second element. For cases in which the initial temporal distribution of sample ions is relatively broad, for example, as the result of using a relatively long laser pulse, it is necessary that the time delay be longer than the total ionization time. For a given mass this can be accomplished by reducing the value of $V_a$. Thus for given initial temporal and energy distributions for an ion of a particular mass-to-charge ratio, and for a given TOF analyzer geometry, the magnitude of the second electric field and the time difference between application of the laser pulse to the sample and application of the second electric field can be determined for optimum mass resolution.

The first electric field is retarding and thus accelerates ions toward the sample surface. The magnitude of this field may be freely chosen An approximately optimum value for the first electric Field, $E_1$ is given by $$E_1=5mv_o/\Delta t \quad (4)$$

where m is the smallest mass of interest in Daltons, $v_o$ is the most probable initial velocity in meters/second, and At is the delay time, in nanoseconds, between the ionization pulse and application of the second field. At this magnitude of the first electric field applied in the retarding direction, ions of the selected mass with velocity equal to one half the most probable velocity will be stopped at the time the second field is applied, and ions with velocity less than one quarter of the most probable velocity will be returned to the sample surface and neutralized. In MALDI only a very small fraction of the ions have velocities less than one quarter of the most probable velocity, thus ions of the selected and higher masses will be extracted and detected with high efficiency. On the other hand, ions of lower mass are partially or totally suppressed. In particular, ions with masses less than about one quarter of the selected mass are almost completely suppressed since they return to the sample and are neutralized before application of the second electric field.

The method may also include a computer algorithm for calculating the optimum values for the electric fields and the time delay, and the use of a computer and computer interface to automatically adjust the outputs of the power sources and the delay generator.

The method may include measuring a sample comprising at least one compound of biological interest selected from the group consisting of DNA, RNA, polynucleotides and synthetic variants thereof or selected from the group consisting of peptides, proteins, PNA, carbohydrates, glycoconjugates and glycoproteins. The sample may include a matrix substance absorbing at the wavelength of the laser pulse to facilitate desorption and ionization of the one or more molecules.

The most significant improvement of performance was observed for highly polar biopolymers such as oligo- and polynucleotides. This improved resolution is essential for the mass spectrometric evaluation of DNA sequencing ladders.

Figure 4A:
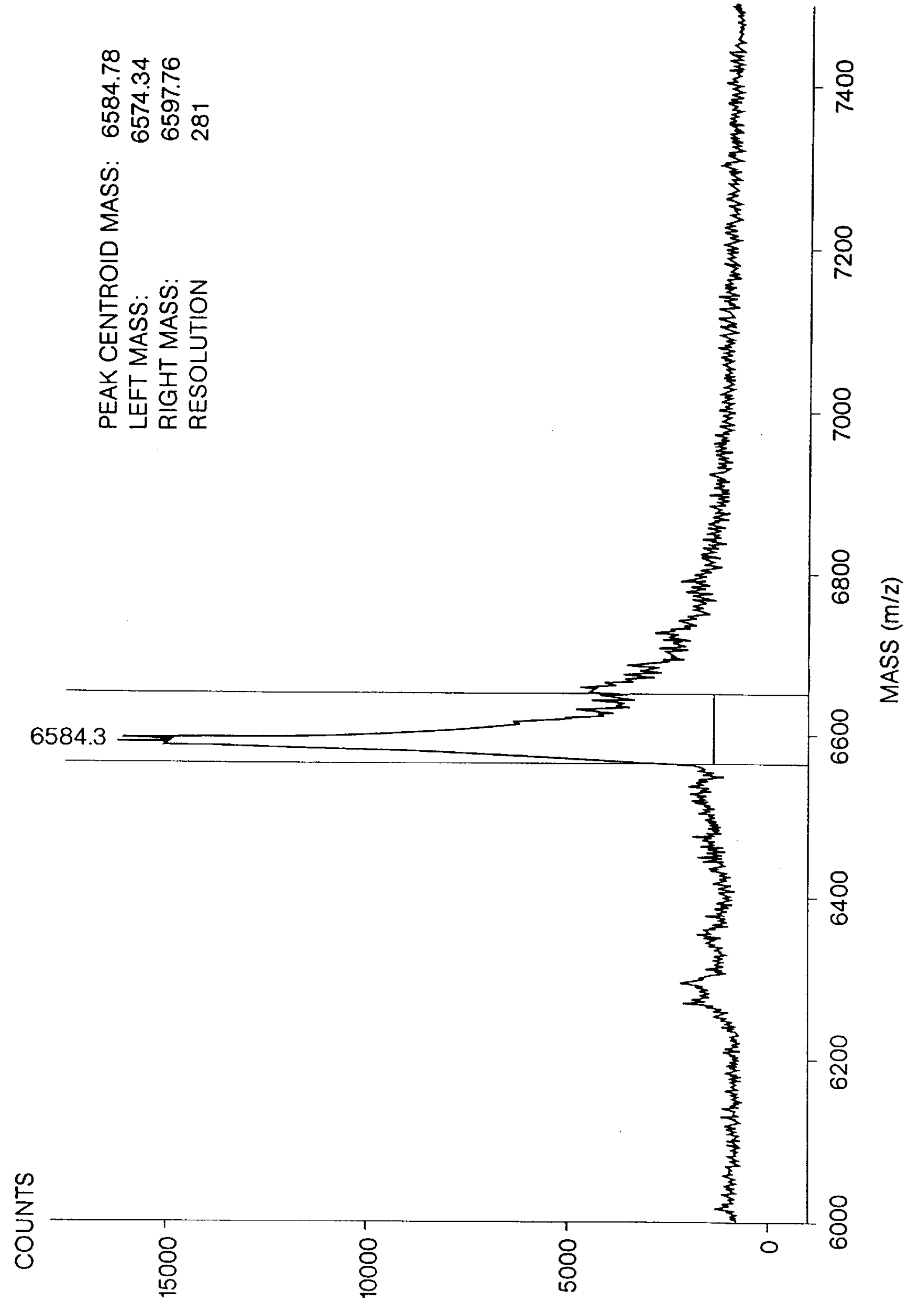
FIGS. 4*a–b* illustrates improvements of mass resolution in oligonucleotides with a MALDI TOF mass spectrometer incorporating principles of this invention.
Figure 4B:
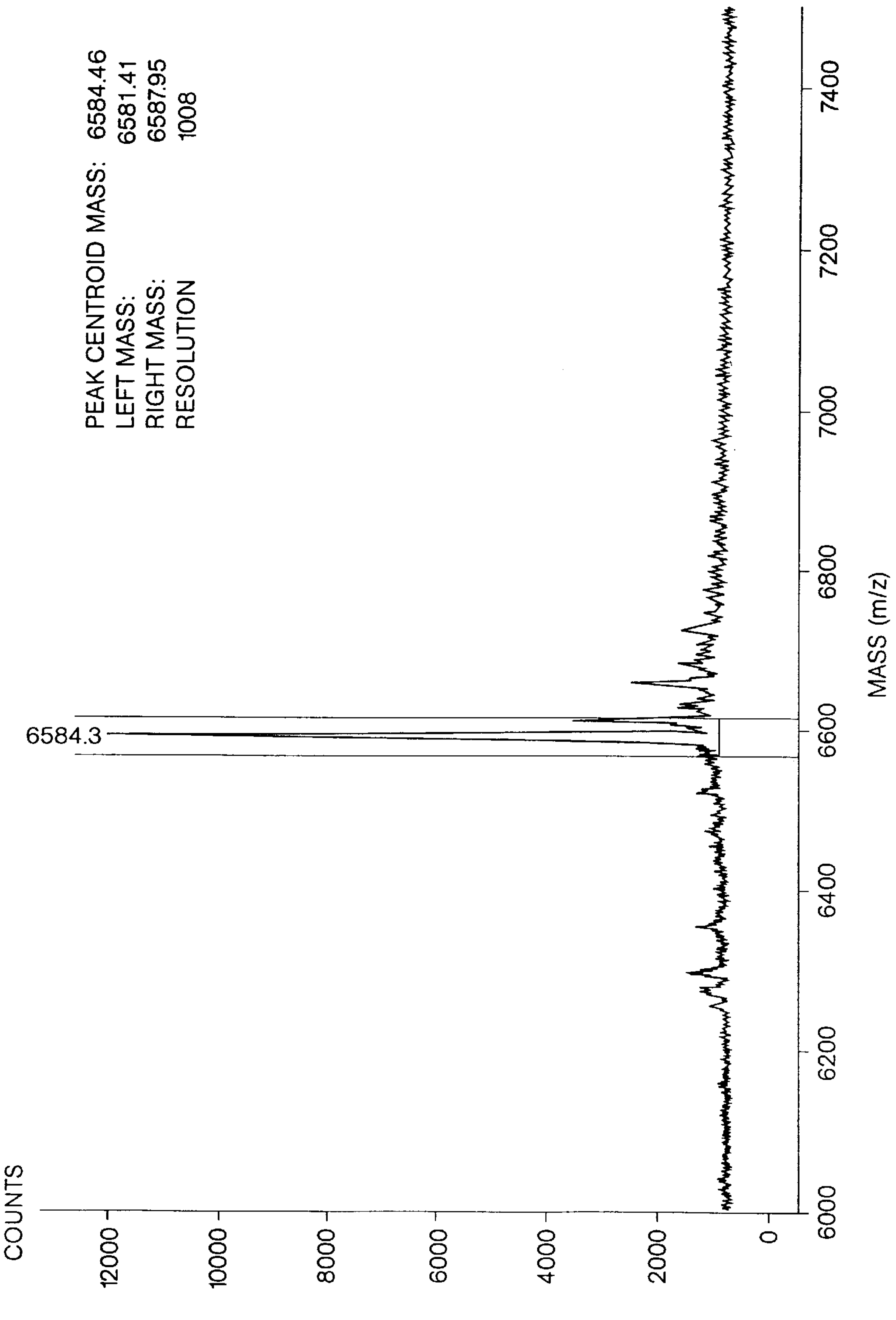

FIGS. 4*a–b* illustrates improvements of mass resolution in oligonucleotides with a MALDI TOF mass spectrometer incorporating the principles of this invention. FIG. 4*a* is a spectrum of a 22mer DNA sample recorded by conventional MALDI. A mass resolution of 281 was obtained. FIG. 4*b* is a spectrum of the same 22mer DNA sample recorded with a MALDI TOF mass spectrometer incorporating the principles of this invention. The mass resolution in FIG. 4*b* corresponds to the isotope limited value. For a small protein of the same molecular mass 500 or 600 mass resolution with conventional MALDI mass spectrometry is routine. Thus there are significant improvements in resolution in MALDI TOF mass spectrometry of DNA and carbohydrates by incorporating the principles of this invention.

One advantage of a MALDI TOF mass spectrometer incorporating the features of the present invention is the ability to correct for initial kinetic energy spread to a higher order by utilizing an ion reflector with the mass spectrometer and correctly choosing the operating parameters.

Figure 5:
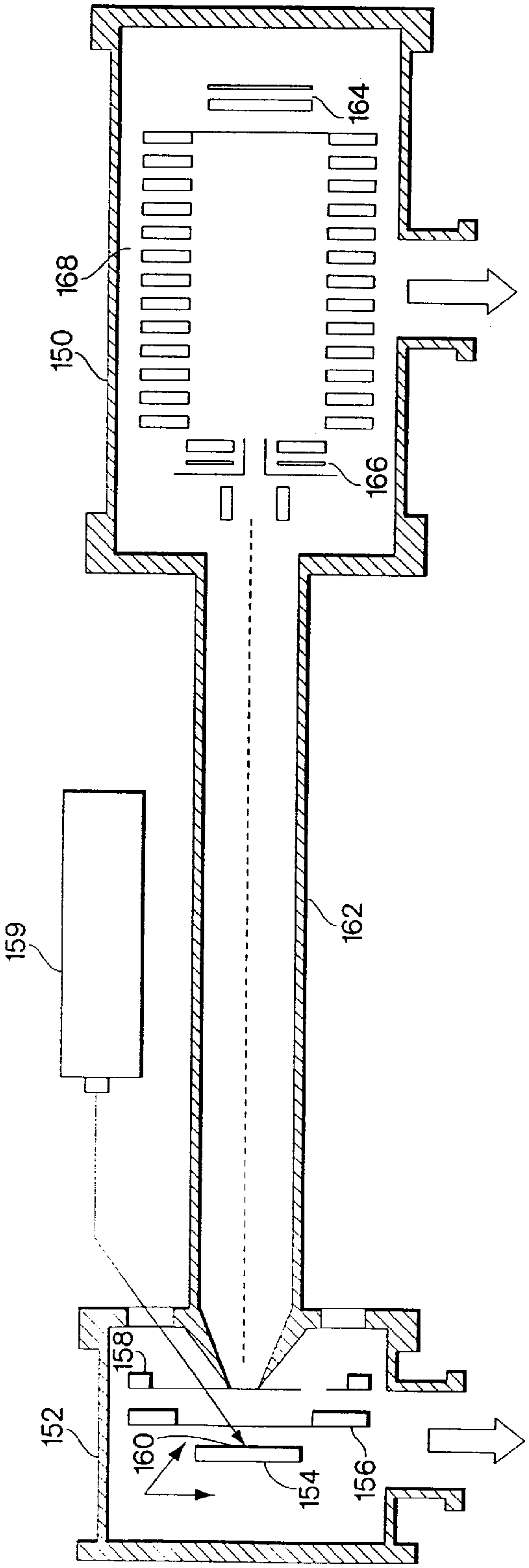
FIG. 5 is a schematic diagram of a laser/desorption time-of-flight mass spectrometer embodying the invention which includes a single stage ion reflector.

FIG. 5 is a schematic diagram of a laser/desorption time-of-flight mass spectrometer which incorporates the principles of this invention and includes a single stage ion reflector 150. This embodiment includes a two-field ion source 152 with a holder 154 and a first 156 and second 158 element. Power supplies (not shown) are electrically connected to the holder 154 and the first 156 and second 158 elements such that the electric field between the first element 156 and the holder 154 is variable before ion extraction as described in the text associated with FIG. 2. This embodiment also includes a laser 159 for ionizing and desorbing sample ions. A sample 160 is proximately disposed to the holder 154. The sample 160 may include a matrix molecule that is highly absorbing at the wavelength of the laser 158. The matrix facilitates desorption and ionization of the sample 160.

The ion reflector 150 is positioned at the end of a field-free drift region 162 and is used to compensate for the effects of the initial kinetic energy distribution by modifying the flight path of the ions. A first detector 164 is used for detecting ions with the ion reflector 150 de-energized. A second detector 166 is used for detecting ion with the ion reflector 150 energized.

The ion reflector 150 is positioned at the end of the field-free drift region 162 and before the first detector 164. The ion reflector 150 consists of a series of rings 168 biased with potentials that increase to a level slightly greater than an accelerating voltage. In operation, as the ions penetrate the reflector 150, they are decelerated until their velocity in the direction of the field becomes zero. At the zero velocity point, the ions reverse direction and are accelerated back through the reflector 150. The ions exit the reflector 150 with energies identical to their incoming energy but with velocities in the opposite direction. Ions with larger energies penetrate the reflector 150 more deeply and consequently will remain in the reflector for a longer time. The potentials are selected to modify the flight paths of the ions such that ions of like mass and charge arrive at the second detector 166 at the same time.

Figure 6A:
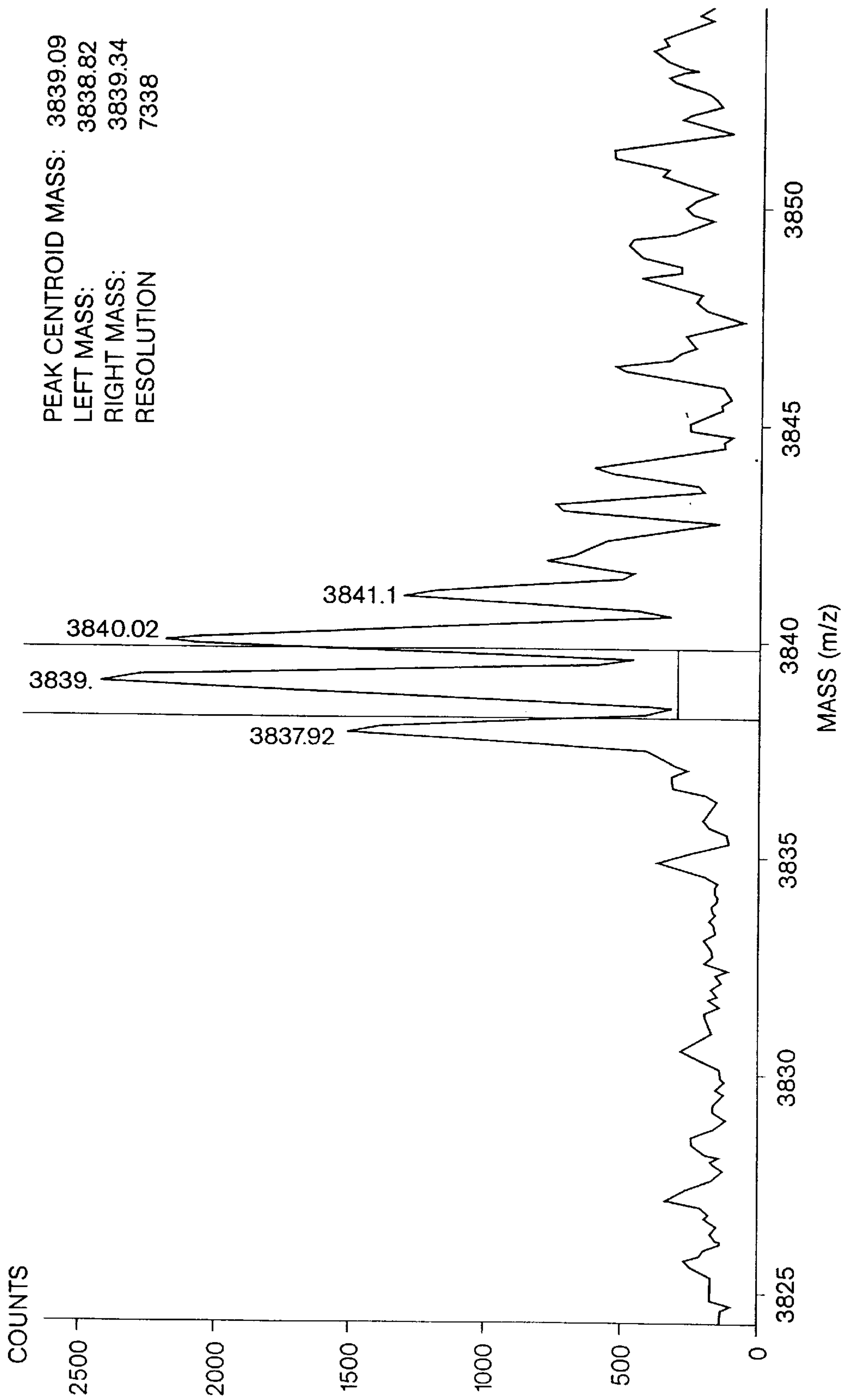
FIGS. 6*a–b* illustrates resolution in excess of 7,000 mass resolution for a RNA 12mer sample at m/z 3839 and about 5,500 mass resolution for a RNA 16mer sample at m/z 5154 recorded with a MALDI TOF mass spectrometer of the type illustrated in FIG. 5.
Figure 6B:
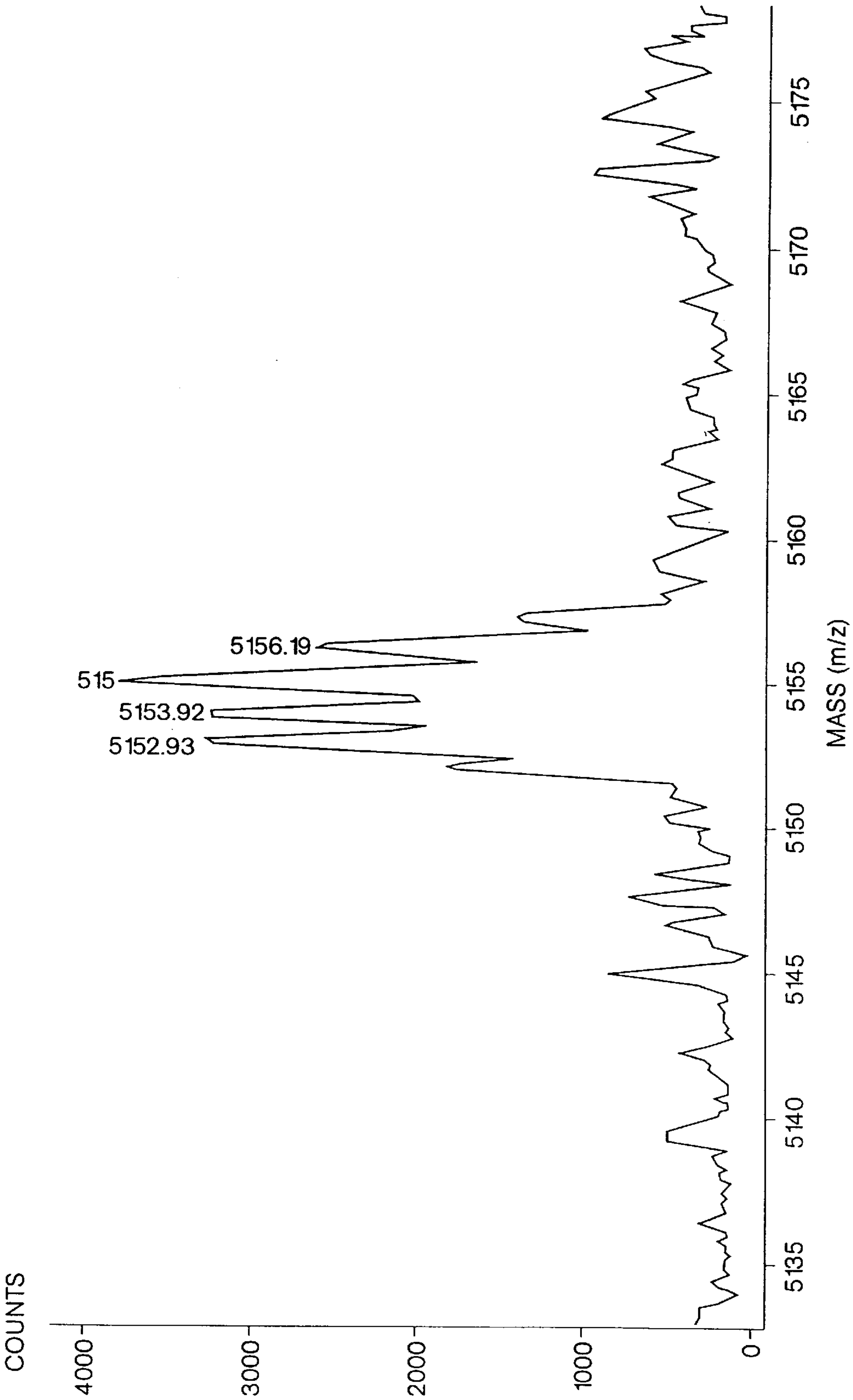

FIGS. 6*a–b* illustrates resolutions of nearly 8,000 mass resolution for a RNA 12mer sample and about 5,500 mass resolution for a RNA 16mer sample recorded with a MALDI TOF mass spectrometer having a reflector and incorporating the principles of this invention. The observed resolution on these examples represents a lower limit, since the digitizing rate of the detector electronics is not sufficient to detect true peak profiles in this resolution range. Comparable performance could be obtained on peptides and proteins. This invention thus improves resolution for all kinds of biopolymers. This is in contrast to conventional MALDI where resolution and sensitivity on oligonucleotides is considerably degraded in comparison with peptides and proteins.

Another advantage of a MALDI TOF mass spectrometer, incorporating the principles of this invention, is the ability to reduce the number of high energy collisions. Under continuous ion extraction conditions, ions are extracted through a relatively dense plume of ablated material immediately after the ionization event. High energy (higher than thermal energies) collisions result in fast fragmentation processes during the acceleration phase which gives rise to an uncorrelated ion signal. This uncorrelated ion signal can significantly increase the noise in the mass spectra. By incorporating the principles of present invention in a mass spectrometer, parameters such as the electric field before and during ion extraction, and the extraction time delay can be chosen such that the plume of the ablated material has sufficiently expanded to reduce the number of high energy collisions.

The present invention also features a method of improving resolution in MALDI TOF mass spectrometry by reducing the number of high energy collisions during ion extraction. A potential is applied to a sample holder having a sample proximately disposed to the sample holder. The sample comprises one or more kinds of molecules to be analyzed. A potential is applied to a first element spaced apart from the sample holder which, together with the potential on the sample holder, defines a first electric field between the sample holder and the first element. The sample is ionized with a laser which generates a pulse of energy to ablate a cloud of ions and neutrals.

A second potential is applied at either the sample holder or the first element at a predetermined time subsequent to the ionization which, together with the potential on the sample holder or first element, defines a second electric field between the sample and the first element. The second electric field extracts the ions after the predetermined time.

The predetermined time is long enough to allow the cloud of ions and neutrals to expand enough to substantially eliminate the addition of collisional energy to the ions during ion extraction. The predetermined time may be greater than the time in which the mean free path of ions in the cloud exceeds the distance between holder and the first element.

The method may also include the step of applying a potential to a second element spaced apart from the first element which, together with the potential on the first element, defines an electric field between the first and second elements for accelerating the ions.

Parameters such as the magnitude and direction of the first and second electric fields and the time delay between the ionization pulse and application of the second electric field are chosen so that the delay time is long enough to allow the plume of neutrals and ions, produced in response to application of the laser pulse, to expand into the vacuum sufficiently so that further collisions between ions and neutrals are unlikely. Parameters are also chosen to insure that sample ions of a selected mass are detected with optimum mass resolution. The parameters may be determined manually or by use of a computer, computer interface, and computer algorithm.

The method may also include analyzing a sample comprising at least one compound of biological interest selected from the group consisting of DNA, RNA, polynucleotides and synthetic variants thereof or at least one compound of biological interest selected from the group consisting of peptides, proteins, PNA, carbohydrates, glycoconjugates and glycoproteins. The sample may include a matrix substance absorbing at the wavelength of the laser pulse to facilitate desorption and ionization of the biological molecules.

The present invention also features a method of reducing the intensity of the matrix signal in matrix-assisted laser desorption/ionization time-of-flight mass spectrometry. The method includes incorporating a matrix molecule into a sample. A first potential is applied to the sample holder. A potential is applied to a first element spaced apart from the sample holder to create a first electric field between the sample holder and the first element which reverse biases the sample prior to the extraction pulse. Reverse biasing is accomplished by making the potential of the first element with respect to the potential of the sample holder, more positive for measuring positive ions and more negative for measuring negative ions.

A sample proximately disposed to the holder is irradiated with a laser producing a pulse of energy. The matrix absorbs the energy and facilitates desorption and ionization of the sample and the matrix. The first electric field is chosen to retard the ions generated from the sample. This field decelerates and directs the ions back toward the sample surface at a nearly uniform initial velocity. The lightest matrix having the smallest mass-to-charge ratio will be turned back first and naturalized on the sample holder while the heavier ions from biomolecules can be extracted for mass analysis.

A second potential is applied to the sample holder at a predetermined time subsequent to the pulse of energy which creates a second electric field between the sample holder and the first element to accelerate ions away from the sample surface. The time between the laser pulse and application of the second potential is chosen so that essentially all of the matrix ions have returned to the sample surface where they are neutralized. Thus the matrix ions are suppressed and the sample ions are extracted.

The method may include the step of applying a potential to a second element spaced apart from the first element which creates an electric field between the first and second elements to accelerate the ions. Parameters such as the magnitude and direction of the first and second electric fields and the time delay between the ionization pulse and the application of the second electric field are chosen so that matrix ions having a mass less than a first selected mass are suppressed while sample ions having a mass greater than a second selected mass are detected with optimum mass resolution. The parameters may be determined manually or by use of a computer, computer interface, and computer algorithm.

The method may include analyzing a sample comprising at least one compound of biological interest selected from the group consisting of DNA, RNA, polynucleotides and synthetic variants thereof or at least one compound of biological interest selected from the group consisting of peptides, proteins, PNA, carbohydrates, glycoconjugates and glycoproteins.

The method may also include the step of energizing an ion reflector spaced apart from the first or second element. Application of the reflector provides a higher order correction for energy spread in the ion beam, and when included in this method provides even higher mass resolution.

Figure 7A:
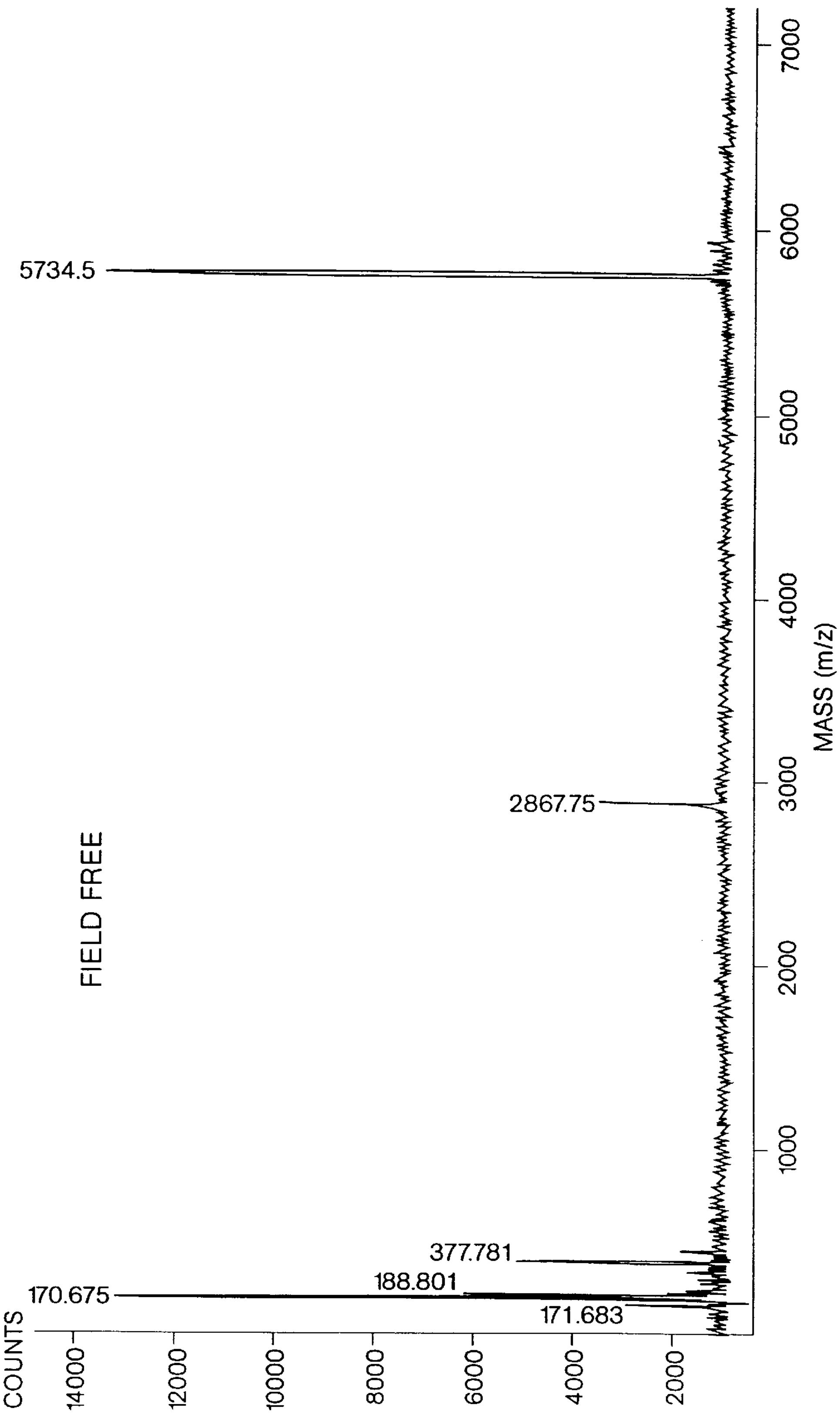
FIGS. 7*a–c* illustrates a reduction and elimination of matrix signal with a MALDI TOF mass spectrometer incorporating the principles of the present invention.
Figure 7B:
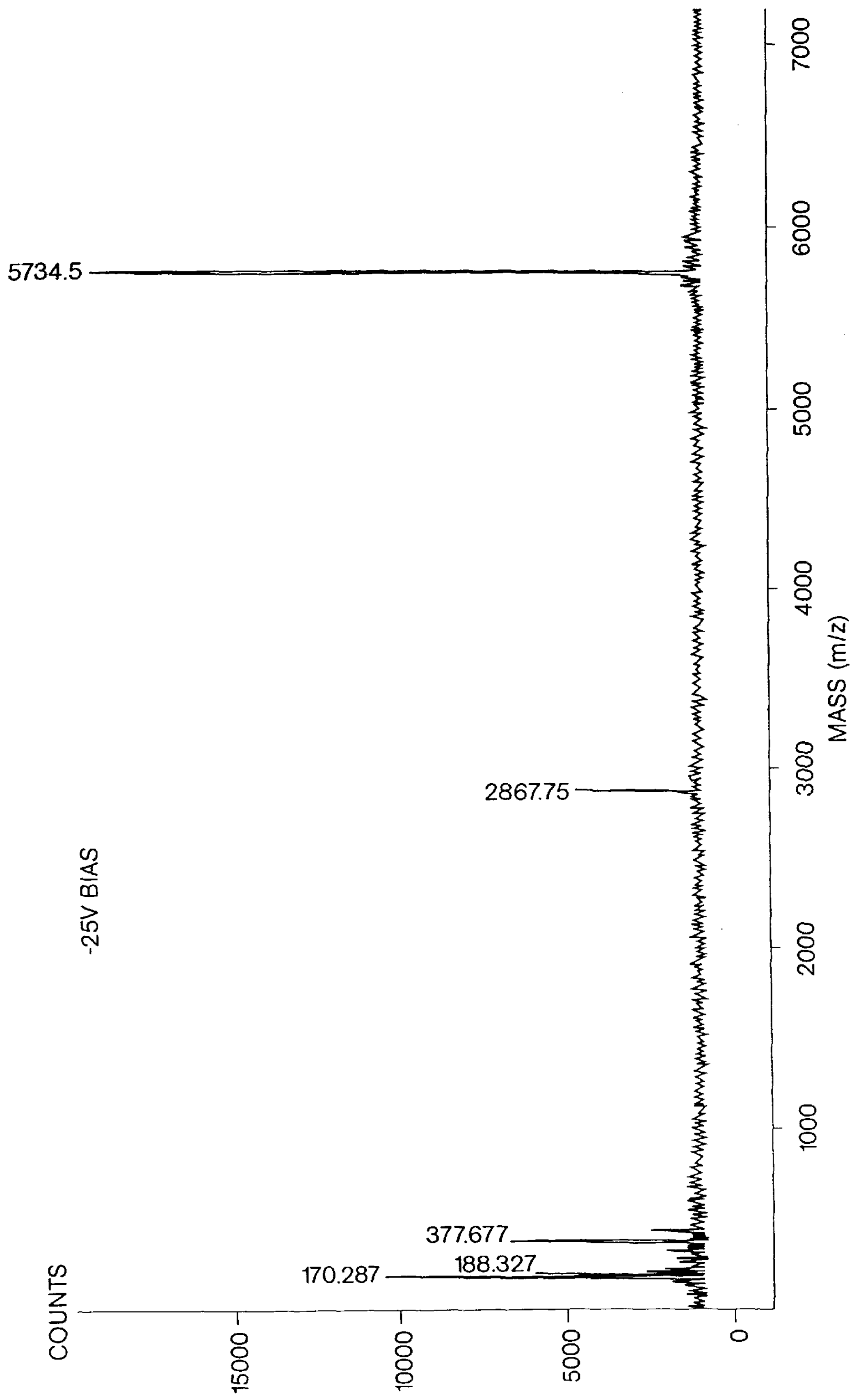
Figure 7C:
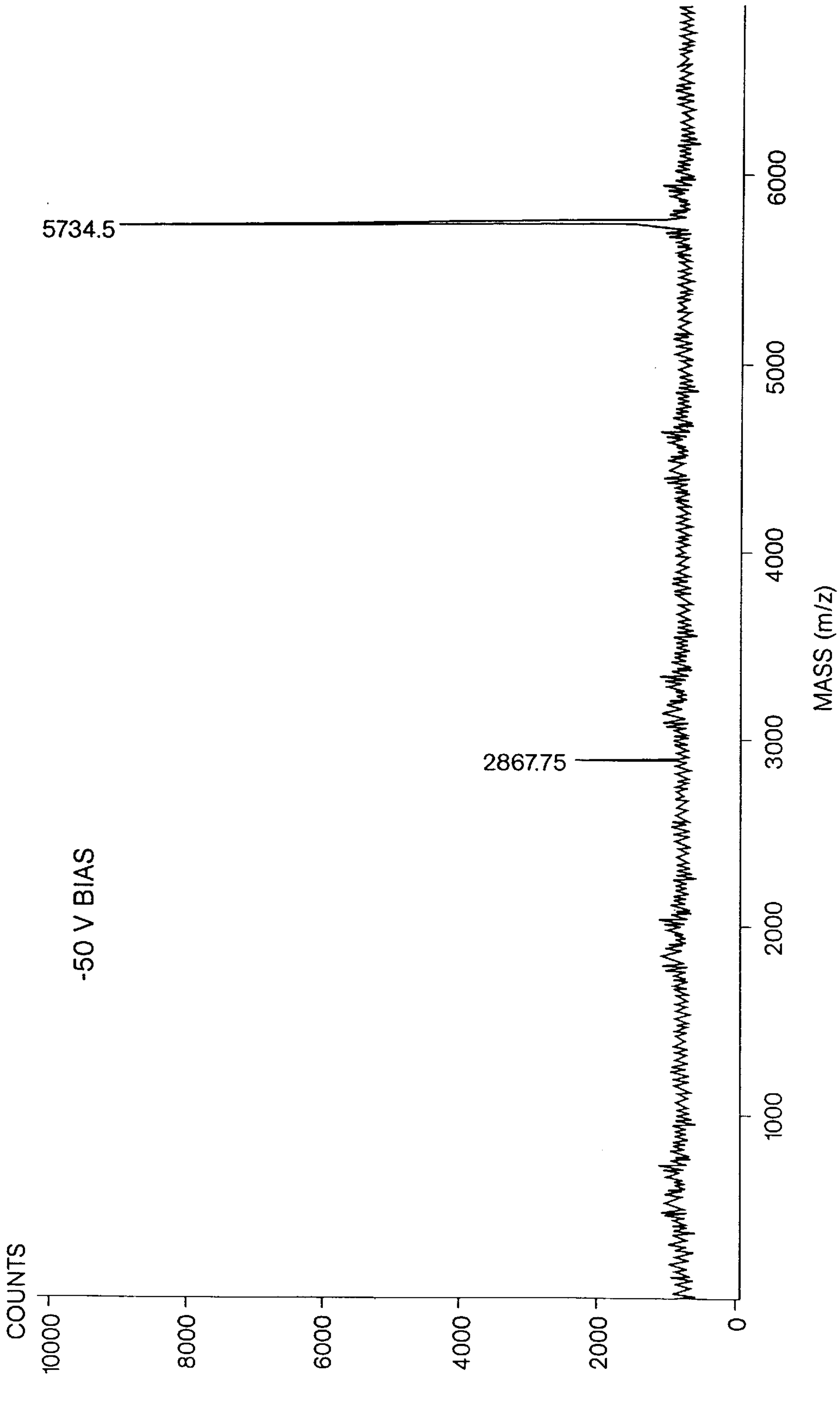

FIGS. 7*a–c* illustrates a reduction and elimination of matrix signal with a MALDI TOF mass spectrometer incorporating the principles of the present invention. FIG. 7*a* illustrates nearly field free conditions where the electric potential of the sample corresponds approximately to the potential on the grid.

Sample peaks are labeled with 2867 and 5734. Peaks below mass-to-charge ratio 400 correspond to matrix ions. In FIG. 7*b*, the sample potential is reverse biased 25 V with respect to the first grid. This results in a visible decrease in the abundance of the lighter matrix ions below a mass-to-charge charge ratio of 200. In FIG. 7*c* the sample potential is reverse biased 50 V with respect to the first grid. This results in complete elimination of the matrix ion signal.

Another advantage of a MALDI TOF mass spectrometer incorporating the principles of this invention is the ability to eliminate the effects of fast fragmentation on background noise and mass resolution. Fast fragmentation is defined as a fragmentation taking place during acceleration under continuous ion extraction conditions. The time scale of fast fragmentation is typically less than one μsec. Fast fragmentation results in ions of poorly defined energies and uncorrelated ion noise (chemical noise).

The present invention also features a method of reducing background chemical noise in matrix-assisted laser desorption/ionization time-of-flight mass spectrometry by allowing time for substantially all fast fragmentation to complete prior to ion extraction. A matrix molecule Is incorporated into a sample comprising one or more molecules to be analyzed so that the matrix substance facilitates intact desorption and ionization. A potential is applied to the sample holder. A potential is applied to a first element spaced apart from the sample holder which, together with the potential on the sample holder, defines a first electric field between the sample and the first element.

The sample is ionized with a laser which generates a pulse of energy where the matrix absorbs at the wavelength of the laser. A second potential is applied to the sample holder at a predetermined time subsequent to the ionization which, together with the potential on the first element, defines a second electric field between the sample holder and the first element to extracts the ions. The predetermined time is long enough to allow substantially all fast fragmentation processes to complete.

The method may include the step of applying a potential to a second element spaced apart from the first element which, together with the potential on the first element, defines an electric field between the first and second elements for accelerating the ions.

Parameters, such as the magnitude and direction of the first and second electric fields and the time delay between the ionization pulse and application of the second electric field, are chosen so that the time delay is long enough to allow substantially all fast fragmentation processes to complete. The parameters are also chosen so that ions of a selected mass are detected with optimum mass resolution. The parameters may be determined manually or by use of a computer, computer interface, and computer algorithm.

The method may include analyzing a sample comprising at least one compound of biological interest selected from the group consisting of DNA, RNA, polynucleotides and synthetic variants thereof or at least one compound of biological interest molecule selected from the group consisting of peptides, proteins, PNA, carbohydrates, glycoconjugates and glycoproteins.

The method may also include the step of energizing an ion reflector spaced apart from the first or second element. Application of the reflector provides a higher order correction for energy spread in the ion beam, and when included in this method provides even higher mass resolution.

Another advantage of a MALDI TOF mass spectrometer, incorporating the principles of present invention, is the ability to generate a correlated ion signal for fast fragmentation. This can be accomplished by delaying ion extraction until substantially all fast fragmentation processes complete. A correspondence can then be established between the ion signal and the chemical structure or sequence of the sample.

Another advantage of a MALDI TOF mass spectrometer, incorporating the principles of present invention, is that the yield of fragment ions can be increased by correctly choosing experimental parameters such as the reverse bias electric field between the sample holder and the first element prior to ion extraction, the delay time between the laser pulse of energy and the ion extraction, and the laser energy density. This can be accomplished either by increasing the residence time of precursor ions in the ion source prior to extraction or promoting additional energy transfer to the sample molecules undergoing fast fragmentation. Residence time of precursor ions can be extended by the proper adjustment of the extracting electric field. Typically a lower extraction field permit a longer optimum extraction delay and hence a longer residence time. Energy transfer to the sample can be enhanced by utilizing very high laser energy densities. Delayed ion extraction is much more tolerant to excessive laser irradiance than conventional MALDI. A proper selection of matrix material and possible additives can also influence energy transfer to the sample molecules.

The present invention also features a method of increasing the yield of sequence defining fragment ions of biomolecules resulting from fast fragmentation processes using matrix-assisted laser desorption/ionization time-of-flight mass spectrometry. The method includes incorporating a matrix molecule into a sample comprising one or more molecules to be analyzed, to facilitate desorption, ionization, and excitation of the molecule. A potential is applied to a sample holder. A potential is applied to a first element spaced apart from the sample holder which, together with the potential on the sample holder, defines a first electric field between the sample holder and the first element.

The molecules are ionized and fragmented with a laser which generates a pulse of energy absorbed by the matrix. A second potential is applied to the sample holder at a predetermined time subsequent to the ionization which, together with the potential on the first element, defines a second electric field between the sample holder and the first element. The second electric field extracts the ions after the predetermined time. The predetermined time is long enough to allow substantially all fast fragmentation to complete.

The method may include the step of applying a potential to a second element spaced apart from the first element which, together with the potential on the first element, defines an electric field between the first and second elements for accelerating the ions.

Parameters such as the magnitude and direction of the first and second electric fields and the time delay between the ionization pulse and application of the second electric field are chosen so that the time delay is long enough to allow substantially all fast fragmentation to complete. These parameters are also chosen to detect the selected mass with optimum mass resolution. The parameters may be determined manually or by use of a computer, computer interface, and computer algorithm.

The method may include the step of detecting the mass-to-charge ratio of the sequence specific fragments generated and the step of identifying a sequence of at least one biomolecule in the sample wherein the biomolecule is selected from the group consisting of DNA, RNA, polynucleotides and synthetic variants thereof or at least one biomolecule selected from the group consisting of peptides, proteins, PNA, carbohydrates, and glycoproteins.

The method may also include the step of increasing the yield of fragments generated by increasing the energy transfer to the biomolecule during ionization. The energy transfer may be increased by selecting a laser wavelength approximately equal to the wavelength at which the biomolecule absorbs. The energy transfer may also be increased by incorporating an additive to the matrix.

The matrix may be selected to specifically promote fragmentation of biomolecules. The biomolecule may be an oligonucleotide and the matrix may comprise at least one of 2,5-dihydroxybenzoic acid and picolinic acid. A second substance may be added to the matrix to promote fragmentation. The additive may absorb at the wavelength of the laser but it is not necessarily effective as matrix in itself. Alternatively the additive may not absorb at the wavelength of the laser, nor be efficient as a matrix in itself, but may promote energy transfer from the matrix to the sample and thus promoting fragmentation.

The method may also include the step of energizing an ion reflector spaced apart from the first or second element. Application of the reflector provides a higher order correction for energy spread in the ion beam, and when included in this method provides even higher mass resolution.

Figure 8A:
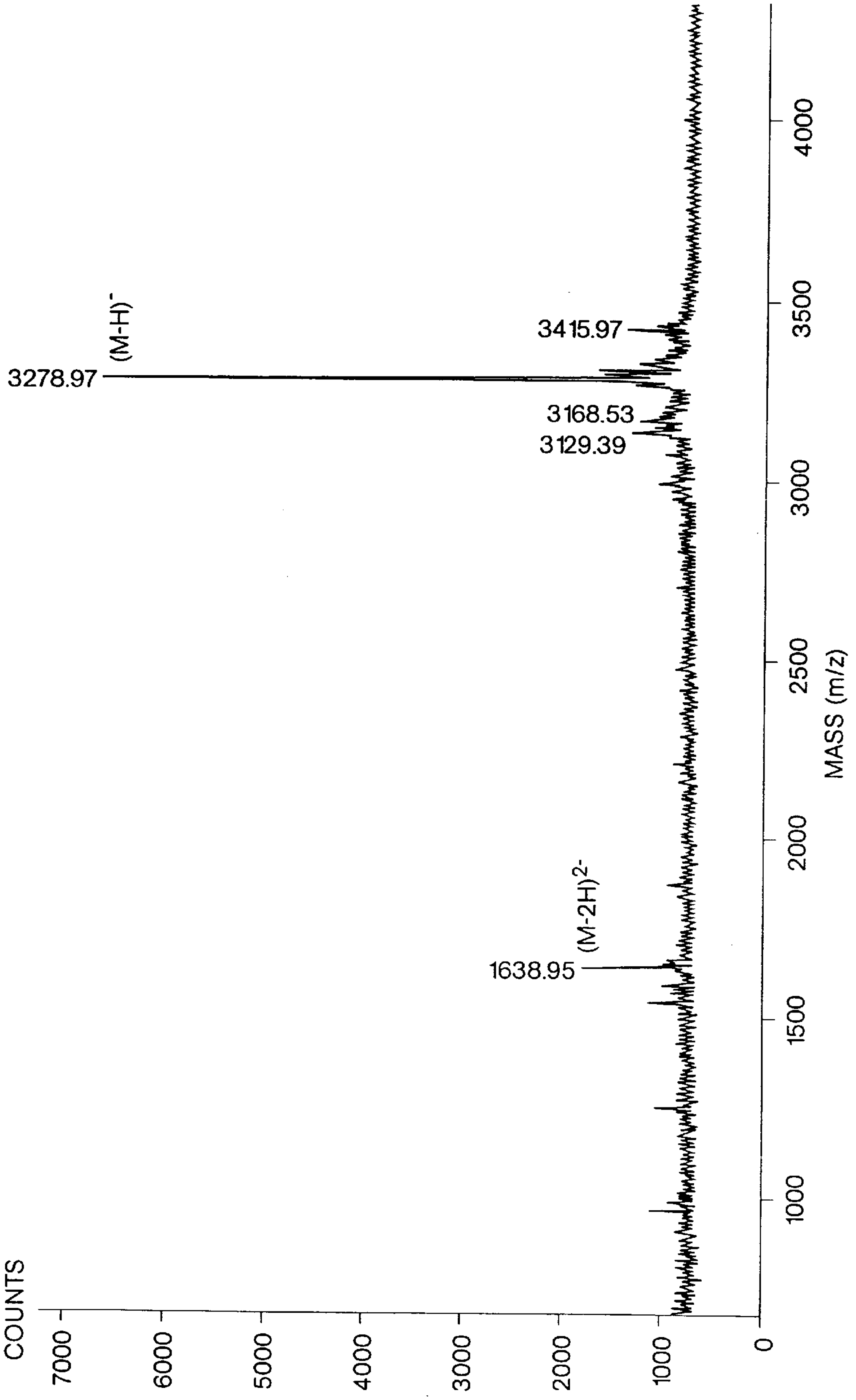
FIGS. 8*a–c* illustrates induced fragmentation for structural characterization of oligonucleotides in MALDI TOF mass spectrometry, including the nomenclature of fragment ion types.

FIG. 8*a* illustrates an 11mer DNA sample generating mostly singly and doubly charged intact ions recorded with a MALDI TOF mass spectrometer incorporating the principles of present invention, where the objective is to suppress fragmentation and obtain high resolution and high sensitivity with minimal fragmentation.

Figure 8B:
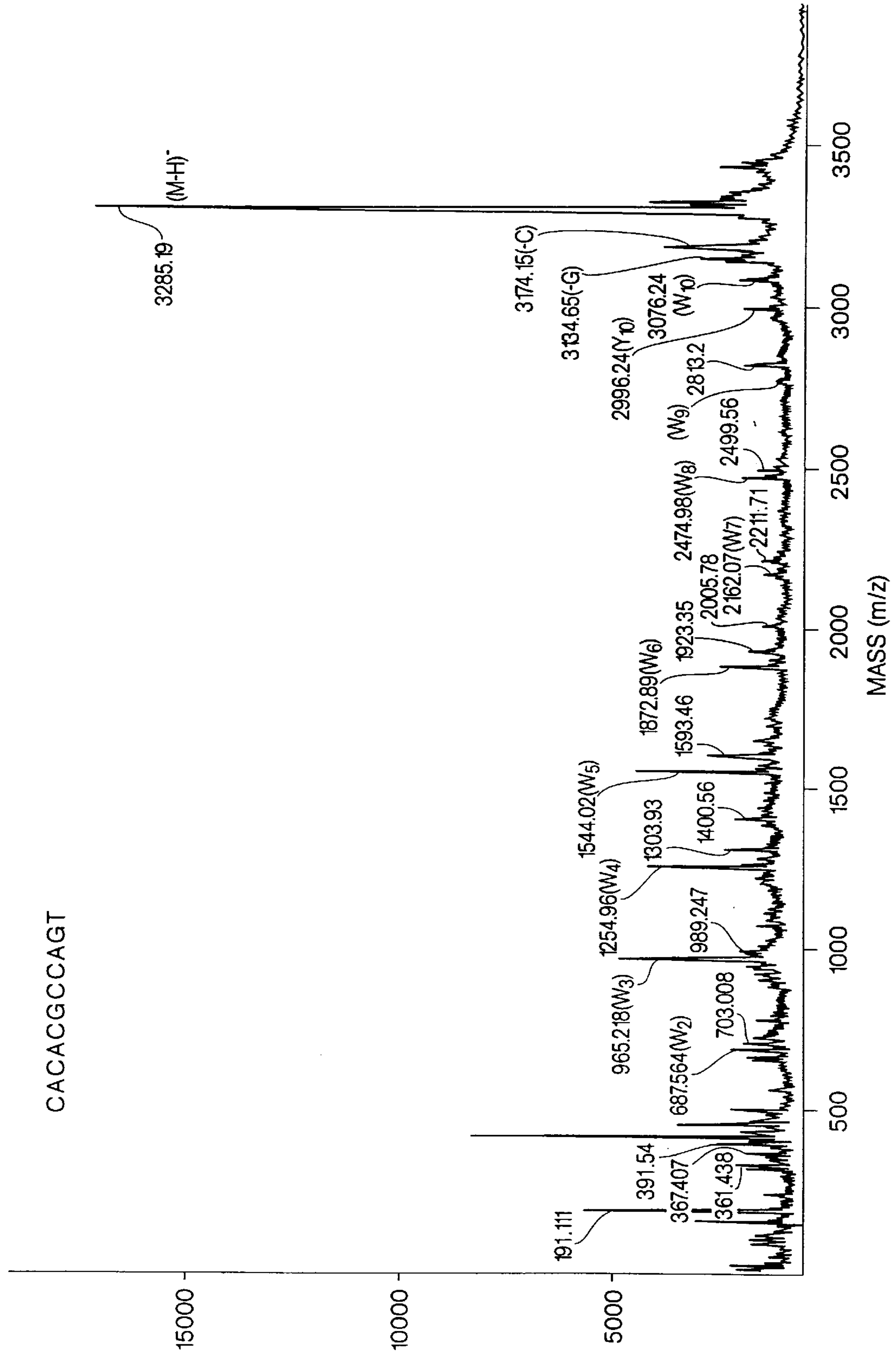
Figure 8C:
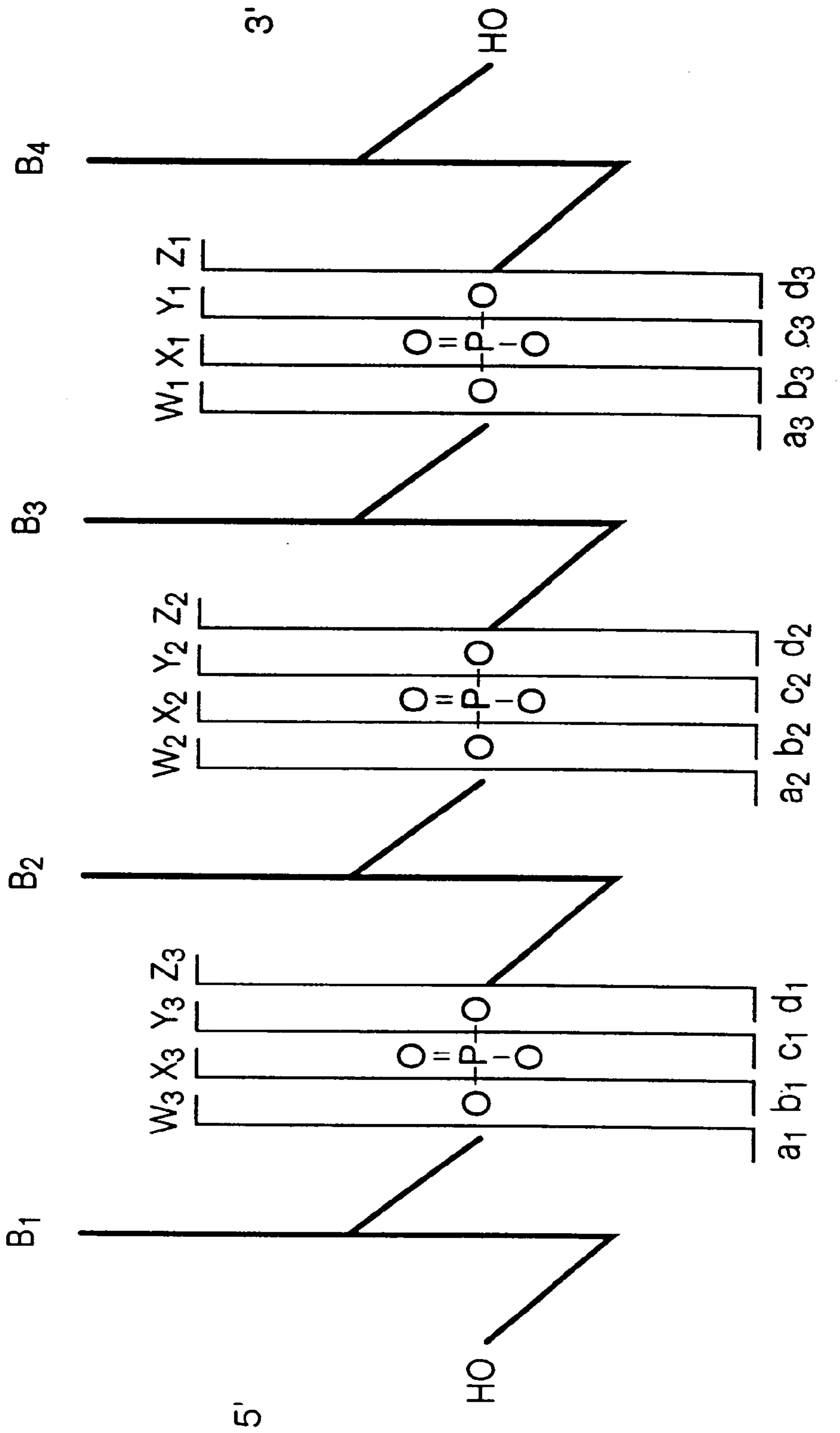

FIG. 8*b* illustrates an 11mer DNA sample recorded with a MALDI TOF mass spectrometer incorporating the principles of the present invention for increasing the yield of fragment ions. The sample is measured with a reverse bias electric field between the sample holder and the first element prior to ion extraction which allows a relatively long extraction delay (500 ns), and a relatively high laser energy density. Fragmentation is further promoted by the use of 2,5-dihydroxybenzoic acid matrix. These experimental parameters result in the generation of abundant fragment ions. The interpretation of this fragment ion spectrum yields the sequence of the oligonucleotide. The "w" ion series is almost complete and defines the sequence up to the two rightmost residues and also provides the composition (but not the sequence) of that dinucleotide piece. FIG. 8*c* describes the nomenclature of the fragment ions.

There are important applications of MALDI TOF mass spectrometry in the art where it is advantageous to use infrared lasers for ionization. Unfortunately, a number of infrared lasers with desirable characteristics, such as the $CO_2$ laser, have pulse widths longer than 100 ns. Typically, the use of such long pulses in conventional MALDI TOF mass spectrometry is undesired since the mass spectral peaks can be excessively wide due to the longer ion formation process. The use of delayed extraction MALDI TOF mass spectrometer, however, can eliminate the undesirable effects of a long ionizing laser pulse. Ions formed in an early phase of the laser pulse are emitted from the sample surface earlier than those formed in a late phase of the laser pulse. During extraction, the early phase ions will be farther away from the sample surface than the late phase ions. Consequently, the late phase ions will be accelerated to a slightly higher energy by the extraction pulse. Under optimized conditions, the late phase ions will catch up with the early phase ions at the detector position.

Another advantage of a MALDI TOF mass spectrometer, incorporating the features of the present invention, is the ability to achieve high mass resolution utilizing a long-pulse infrared laser. A long pulse is defined as a pulse with a length longer than the desirable peak width of an ion packet when detected. With pulsed ion extraction instruments, desirable peak widths are typically 5–100 ns. The desirable peak width varies with the mass-to-charge ratio of the ions, for example, 5 ns for an isotopically resolved small peptide and 100 ns for a protein of mass-to-charge ratio of 30,000.

The present invention also features a method of improving resolution in long-pulse laser desorption/ionization time-of-flight mass spectrometry. A first potential is applied to a sample holder. A second potential is applied to a first element spaced apart from the sample holder which, together with the potential on the sample holder, defines a first electric field between the sample holder and the first element. A sample proximately disposed to the sample holder is ionized to form ions with an infrared laser which generates a pulse of energy with a long time duration. The time duration of the pulse of energy is greater than 50 ns.

The potential on the first element with respect to the sample holder may be more positive for measuring positive ions and more negative for measuring negative ions to spatially separate ions by their mass prior to ion extraction. At least one of the first or second potentials is varied at a predetermined time subsequent to ionization to define a second different electric field between the sample holder and the first element which extracts ions for a time-of-flight measurement. The predetermined time may be greater than the duration of the laser pulse.

The method may include the step of applying a potential to a second element spaced apart from the first element which, together with the potential on the first element, defines an electric field between the first and second elements for accelerating the ions.

The sample may comprise a matrix substance absorbing at the wavelength of the laser pulse to facilitate desorption and ionization of sample molecules. The sample may also comprise at least one compound of biological interest selected from the group consisting of DNA, RNA, polynucleotides and synthetic variants thereof or at least one compound of biological interest selected from the group consisting of peptides, proteins, PNA, carbohydrates, glycoconjugates and glycoproteins.

Figure 9A:
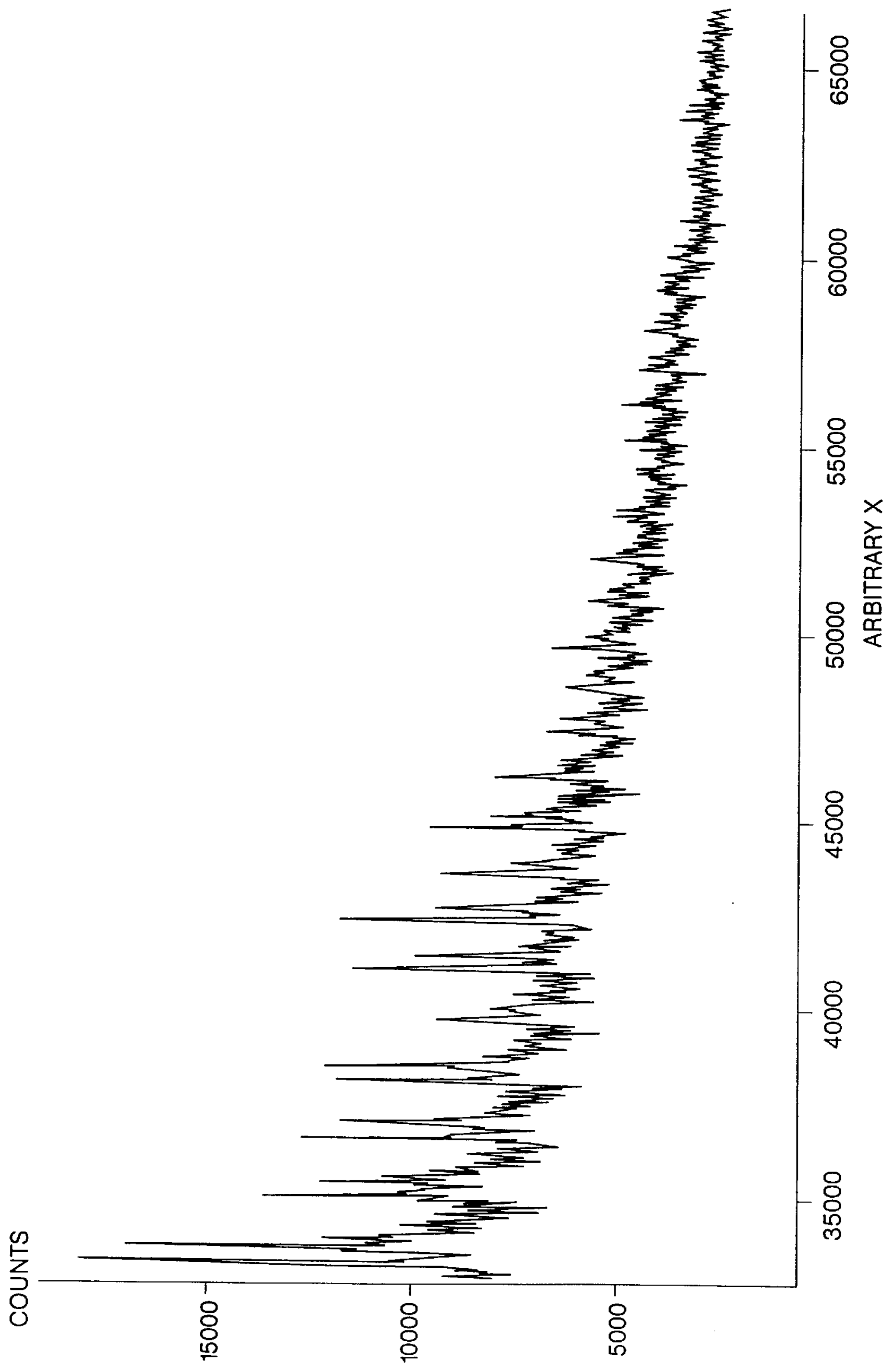
FIGS. 9*a–c* illustrates the ability to analyze very complex oligonucleotide mixtures with a MALDI TOP mass spectrometer incorporating principles of this invention.
Figure 9B:
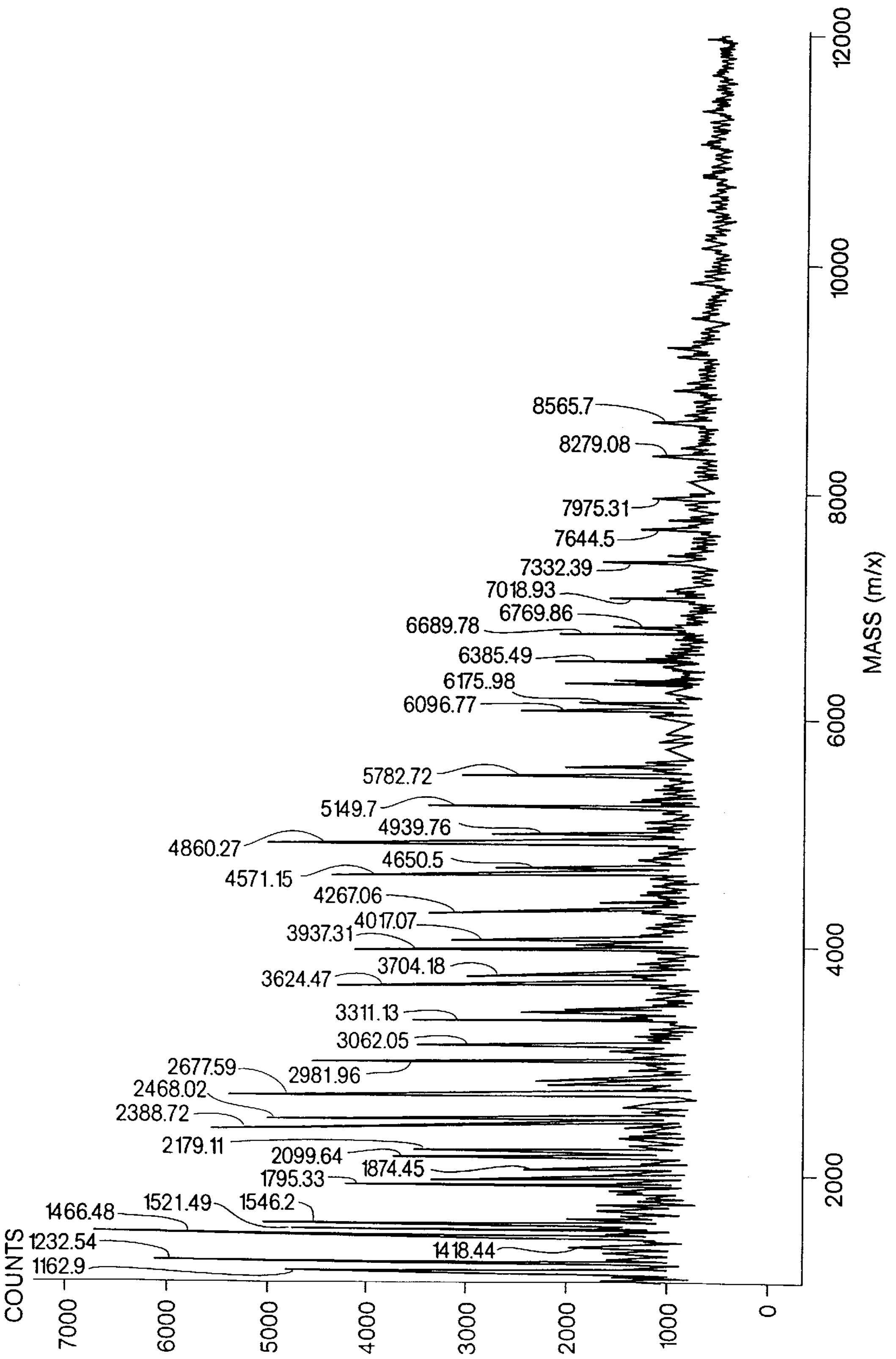
Figure 9C:
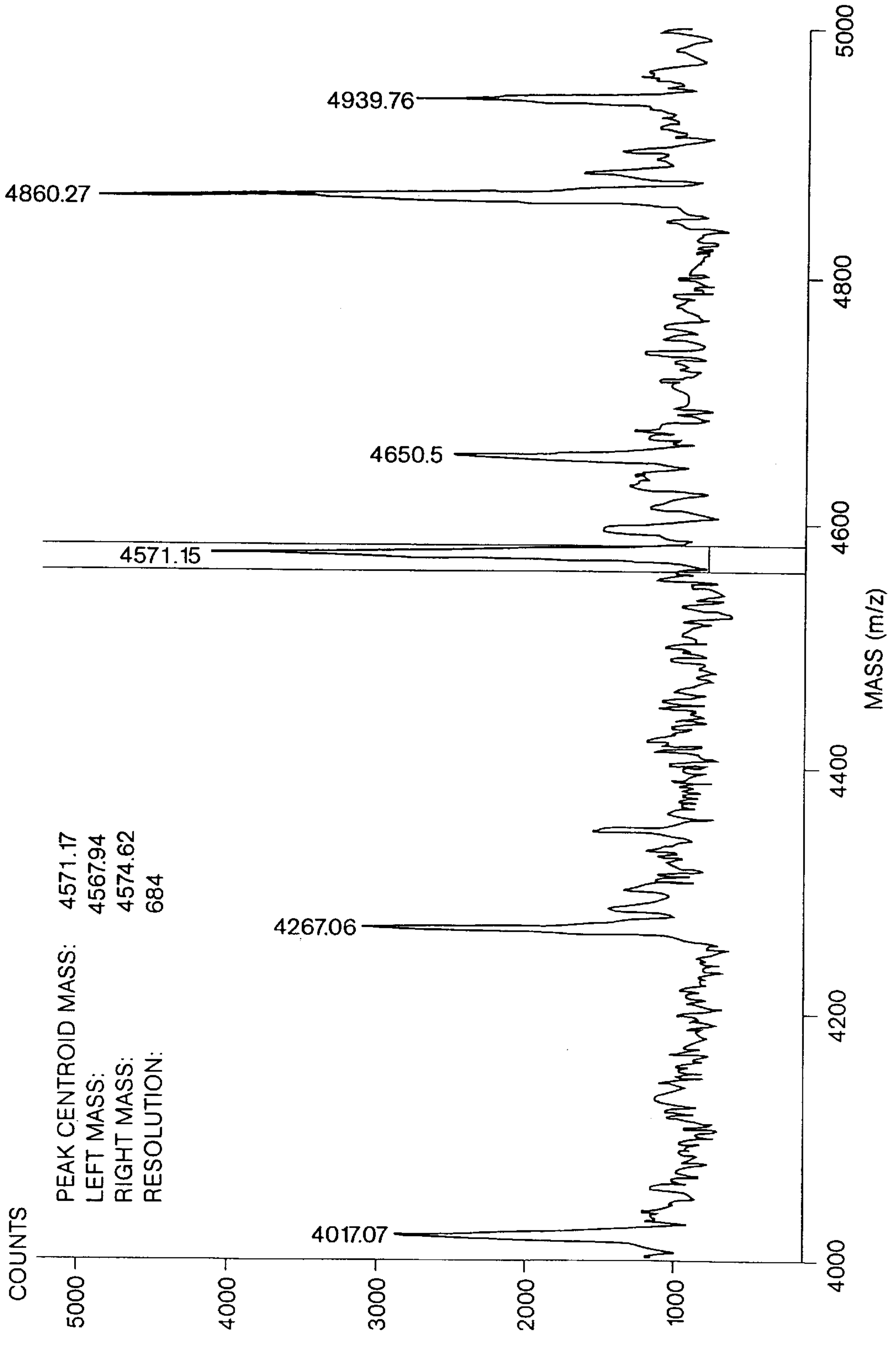

FIGS. 9*a–c* illustrates the ability to analyze very complex oligonucleotide mixtures with a MALDI TOF mass spectrometer incorporating the principles of this invention. FIG. 9*a* is a mass spectrum of a 60mer DNA sample containing sequence specific impurities recorded with conventional MALDI TOF mass spectrometer. The sequence is not readable.

FIG. 9*b* is a mass spectrum of a 60mer DNA sample containing sequence specific impurities recorded with a MALDI TOF mass spectrometer incorporating the principles of this invention. More than half of its sequence can be read from the spectrum. FIG. 9*c* presents an expanded portion the mass spectrum presented in FIG. 9*b*. The level of performance indicated by FIG. 9*c* is adequate to analyze DNA sequencing ladders all in one vial. Thus by using a MALDI TOF mass spectrometer incorporating the principles of this invention, one can analyze a single Sanger mixture with all the four series present. The ability to sequence DNA with impurities is essential to the possibility of profiling DNA sequencing mixtures.

The present invention also features a method of sequencing DNA by mass spectrometry. The method includes applying a first potential to a sample holder comprising a piece of DNA of unknown sequence. A second potential is applied to a first element spaced apart from the sample holder which, together with the potential on the sample holder, defines a first electric field between the sample holder and the first element. The sample is ionized to form sample ions. At least one of the first or second potentials is changed at a predetermined time subsequent to ionization to define a second different electric field between the sample holder and the first element which extracts ions for a time-of-flight measurement. The measured mass-to-charge ratio of the ions generated are used to obtain the sequence of the piece of DNA The DNA in the sample is cleaved to produce sets of DNA fragments, each having a common origin and terminating at a particular base along the DNA sequence. The sample may comprise different sets of DNA fragments mixed with a matrix substance absorbing at a wavelength substantially corresponding to the quantum energy of the laser pulse which facilitates desorption and ionization of the sample. The mass difference between the detected molecular weight of a peak of one of the sets of DNA fragments compared to a peak of another of the sets of DNA fragments can be determined.

The present invention also features a method of improving resolution in laser desorption/ionization time-of-flight mass for nucleic acids by reducing high energy collisions and ion charge exchange during ion extraction. A potential is applied to a sample holder comprising a nucleic acid. A potential is applied to a first element spaced apart from the sample holder which, together with the potential on the sample holder, defines a first electric field between the sample holder and the first element. A sample is ionized to form a cloud of ions with a laser which generates a pulse of energy. A second potential is applied to the sample holder at a predetermined time subsequent to the ionization which, together with the potential on the first element, defines a second electric field between the sample holder and the first element, and extracts the ions after the predetermined time. A potential may be applied to a second element spaced apart from the first element which, together with the potential on the first element, defines an electric field between the first and second elements for accelerating the ions.

The predetermined time is chosen to be long enough to allow the cloud of ions to expand enough to substantially eliminate the addition of collisional energy and charge transfer from the ions during ion extraction. The predetermined time can be chosen to be greater than the time in which the mean free path of ions in the cloud approximately equals the distance between the holder and the first element. The predetermined time can also be chosen to be greater than the time it takes for substantially all fast fragmentation to complete.

The sample may comprise a matrix substance absorbing at the wavelength of the laser pulse to facilitate desorption and ionization of the sample.

The present invention also features a method of obtaining accurate molecular weights of MALDI TOF mass spectrometry. A major problem with MALDI TOF mass spectrometry is that it is difficult to obtain accurate molecular weights without the use of internal standards consisting of known compounds to a sample containing an unknown compound. Unfortunately, different samples respond with widely different sensitivities and often several attempts are required before a sample containing the correct amount of internal standard can be prepared. Also, the internal standard may interfere with the measurement by producing ions at the same masses as those from an unknown sample. Thus for many applications of MALDI TOF mass spectrometry it is important to be able to convert the measured time-of-flight to mass with very high precision and accuracy without using internal standards.

In principle, it is possible to calculate the time-of-flight of an ion of any mass as accurately as the relevant parameters, such as voltages and distances. But in conventional MALDI TOF mass spectrometry accurate calculations are generally not possible because the velocity of the ions after acceleration is not accurately known. This uncertainty occurs because of collisions between ions and neutrals in the plume of material desorbed from the sample surface. The energy lost in such collisions varies with parameters such as laser intensity and mass. Thus, the relationship between measured flight time and mass is different from one spectrum to the next. To obtain accurate masses it is necessary to include known compounds with masses similar to those of the unknown sample to accurately calibrate the spectrum and determine the mass of an unknown.

In the present invention, the ions are produced initially in a region in which the electrical field is weak to zero. The initial field may accelerate ions in the direction opposite to that in which they are eventually extracted and detected. In this method, application of the extraction field is delayed so that the plume is sufficiently dissipated such that significant energy loss due to collisions is unlikely. As a result, the velocity of any ion at any point in the mass spectrometer can be precisely calculated and the relationship between mass and time-of-flight is accurately known so that internal calibration of spectra is not required.

With pulsed ion extraction, the mass of an ion is given to a very high degree of approximation by the following equation:

$$M^{1/2}=A_1(t+A_2)(1-A_3\Delta t+A_4t+A_5t^2) \quad (5)$$

where t is the measured flight time in nanoseconds. $A_1$ is the proportionality constant relating mass to flight time when the initial velocity of the ions is zero. $A_2$ is the time delay in nanoseconds between the laser pulse and start of the transient digitizer. $A_3$ is small except when delayed sweeps are employed. The time delay At is the time between the laser pulse and the application of the drawout field. The other terms are corrections which depend only on the initial velocity, the voltage on the first element and the geometry of the instrument.

The above coefficients can be described in terms of instrument parameters in the following way:

$$A_1=V_S^{1/2}(1+\alpha G_w)/[4.569D_e] \quad (6)$$

where $$D_e=Dzg(y), \quad (7)$$

$V_S$ is the source voltage in kilovolts, D is the field-free distance in mm, $G_W$ is the guide wire setting (% of source voltage), α is a constant to be determined empirically, $$g(y)=1+2y^{1/2}[d_a/D+(d_o/D)(1/\{y^{1/2}+1\})], \quad (8)$$

$$z=1+(2d_m/D)(V_s/V_m)\{[1+(V_m/V_s)]^{1/2}-1\}, \quad (9)$$

$d_a$ is the length of the first ion accelerating region in mm, $d_o$ is the length of the second accelerating region in mm, $d_m$ is the length of the accelerating region in front of the electron multiplier in mm, $V_m$ is voltage applied to the front of the electron multiplier in kilovolts, $$y=V_s/(V_s-V_g)=100/(100-G_R), \text{ and} \quad (10)$$

$G_R$ is the grid setting in percent of source voltage. The guide wire correction depends on the most probable trajectory of ions about the wire. The maximum value of δ is 0.005 which corresponds to the ions traveling through the drift tube at precisely the guide wire potential. Note the actual value of δ will be somewhat less than this, depending on laser alignment.

The higher order correction terms are given by $$A_3=v_owy^{1/2}/2D_e \quad (11)$$

$$A_4=v_od_ay/2D_e^2 \quad (12)$$

$$A_5=v_o^2d_awy^{3/2}/8D_e^3 \quad (13)$$

where $v_o$ is the initial velocity in millimeters/nanosecond, and w is given by $$w=y^{-3/2}[(D/2d_a-(d_o/d_a)(1+x)]+x(d_o/d_a)-1 \quad (14)$$

where $$x=(V_s-V_g)/V_g=(100-G_R)/G_R. \quad (15)$$

These values strictly apply only to operating with the first field at zero before the application of the drawout pulse.

When employing an ion detector, the effective drift distance becomes $$D_e=Dzg(y)+4d_R/R \quad (16)$$

where $d_R$ is the length of the mirror in mm and R is the ratio of the mirror voltage to source voltage. Under normal operation of the reflector, the quantity w becomes $$w=x(d_o/d_a)-1. \quad (17)$$

With these changes the calibration equations are exactly the same as those used for the linear analyzer. It should be noted that y and w are generally much smaller for the reflector, thus the correction terms are also smaller.

Equivalents

While the invention has been particularly shown and described with reference to specific preferred embodiments, it should be understood by those skilled in the art that various changes in form and detail may be made therein without departing from the spirit and scope of the invention as defined by the appended claims. For example, although a pulsed laser is described as the ion source, it is noted that other pulsed ion sources can be used without departing from the spirit and scope of the invention.

What is claimed is:

1. Method for high mass-resolution analysis of a sample on a sample holder by a time-of-flight mass spectrometer with a drift tube and an ion source, the sample holder being biased at an ion acceleration potential, and a first element and a second element being biased at a drift tube potential, the method comprising the following steps:

(a) setting the potential of the first element to a potential similar to that of the sample holder;

(b) desorbing and ionizing the sample molecules by a pulse of energy, focused at the sample holder;

(c) waiting for a selected time delay defined essentially by:

$$\Delta=144.5d_a(m/V_a)^{1/2}[1/w+(V_o/V_a)^{1/2}],$$

wherein $\Delta$ is the selected time delay in nanoseconds, $d_a$ is a distance between the sample and the first element in millimeters, m is a mass of the ions in Daltons, $V_a$ is a potential difference in volts, and $V_o$ is an initial kinetic energy of the ions in electron volts; and (d) starting the acceleration of the ions by switching the potential of the first element to a suitable potential while keeping constant the potential of the sample holder.

2. Method as in claim 1, wherein the first element takes the form of a grid, at least at its center.

3. Method as in claim 1, wherein the first element has a circular aperture through which the ions are drawn.

4. Method as in claim 1, wherein the ionization is performed by matrix-assisted laser desorption and ionization (MALDI).

5. Method as in claim 1, wherein the potential of the first element is set exactly to the potential of the sample holder in step (a).

6. Method as in claim 1, wherein a weak field strength between sample holder and first element is maintained before starting step d).

7. Method as in claim 1, wherein the sample holder is at ground potential, and the drift tube is at high potential, attracting the ions to be analyzed.

8. Method as in claim 1, wherein the sample holder is at high potential, repelling the ions to be analyzed, and the drift tube is at ground potential.

* * * * *